(12) United States Patent
Forutanpour

(10) Patent No.: US 7,800,661 B2
(45) Date of Patent: Sep. 21, 2010

(54) PROGRAMMABLE PATTERN MATCHING DEVICE

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 11/614,987

(22) Filed: Dec. 22, 2006

(65) Prior Publication Data

US 2008/0152230 A1    Jun. 26, 2008

(51) Int. Cl.
*H04N 9/64* (2006.01)

(52) U.S. Cl. .................. 348/246; 348/241; 348/245; 348/247

(58) Field of Classification Search ......... 382/165–167, 382/209; 348/241–247
See application file for complete search history.

(56) References Cited

U.S. PATENT DOCUMENTS

| | | | |
|---|---|---|---|
| 5,420,971 A | | 5/1995 | Westerink et al. |
| 5,436,659 A * | | 7/1995 | Vincent ...................... 348/246 |
| 5,657,400 A * | | 8/1997 | Granfors et al. ............. 382/254 |
| 5,805,216 A * | | 9/1998 | Tabei et al. .................. 348/246 |
| 5,917,935 A * | | 6/1999 | Hawthorne et al. ......... 382/149 |
| 6,642,960 B1 | | 11/2003 | Kohashi et al. ............. 348/246 |
| 6,724,945 B1 * | | 4/2004 | Yen et al. ..................... 382/274 |
| 6,766,056 B1 * | | 7/2004 | Huang et al. ................ 382/190 |
| 6,768,513 B1 * | | 7/2004 | Watanabe et al. ........... 348/246 |
| 6,900,836 B2 | | 5/2005 | Hamilton, Jr. |
| 7,047,325 B2 * | | 5/2006 | Kondo et al. ................. 710/16 |
| 7,068,852 B2 * | | 6/2006 | Braica ........................ 382/266 |
| 7,199,824 B2 * | | 4/2007 | Chang et al. ................ 348/246 |
| 7,447,378 B2 * | | 11/2008 | Kondo et al. ................ 382/266 |
| 7,593,569 B2 * | | 9/2009 | Sakurai ....................... 382/167 |

(Continued)

FOREIGN PATENT DOCUMENTS

EP    1049041    11/2000

(Continued)

OTHER PUBLICATIONS

Partial International Search Report—PCT/US07/088757, International Search authority—European Patent Office—Apr. 16, 2008.

(Continued)

*Primary Examiner*—Nhan T Tran
*Assistant Examiner*—Don Nguyen
(74) *Attorney, Agent, or Firm*—George C. Pappas; Michael J. DeHaemer

(57) ABSTRACT

A programmable pattern-matching device is provided that may perform bad pixel correction and image sharpening and smoothing (noise removal). Soft edges of an image are identified and adaptively sharpened. Soft edges are identified by subtracting adjacent pixel values along a diagonal, row and/or column, generating a pixel string pattern based on the pixel value differences, and comparing the pixel string pattern to predefined string patterns indicative of a soft edge. Similarly, hard edges are identified by comparing the pixel string pattern to predefined string patterns indicative of a hard edge, which are then excluded from a low pass filter applied to smooth the image in order to reduce image noise. Bad photosensors of an image sensor are detected by subtracting a pixel value for a first photosensor from its surrounding photosensors to obtain a pixel string pattern that is then compared to predefined string patterns indicative of a bad pixel.

41 Claims, 19 Drawing Sheets

U.S. PATENT DOCUMENTS

| | | | |
|---|---|---|---|
| 2002/0019892 A1* | 2/2002 | Kondo et al. | 710/62 |
| 2002/0122123 A1* | 9/2002 | Kimura | 348/246 |
| 2002/0149683 A1* | 10/2002 | Post | 348/246 |
| 2002/0163674 A1* | 11/2002 | Hamilton, Jr. | 358/461 |
| 2003/0179418 A1* | 9/2003 | Wengender et al. | 358/437 |
| 2003/0222995 A1* | 12/2003 | Kaplinsky et al. | 348/247 |
| 2004/0037457 A1* | 2/2004 | Wengender et al. | 382/141 |
| 2004/0051798 A1* | 3/2004 | Kakarala et al. | 348/246 |
| 2005/0010621 A1 | 1/2005 | Pinto et al. | |
| 2005/0219390 A1 | 10/2005 | Tajima et al. | |
| 2006/0044425 A1* | 3/2006 | Yeung et al. | 348/246 |
| 2006/0132626 A1 | 6/2006 | Sakurai | |
| 2007/0153359 A1* | 7/2007 | Bryant | 359/291 |
| 2007/0216786 A1* | 9/2007 | Hung et al. | 348/246 |

FOREIGN PATENT DOCUMENTS

| | | |
|---|---|---|
| EP | 1594308 | 11/2005 |
| JP | 2003348456 | 12/2003 |
| JP | 2005236749 | 9/2005 |
| WO | 0152188 | 7/2001 |

OTHER PUBLICATIONS

International Search Report—PCT/US07/088757, International Search Authority—European Patent Office—Rijswijk—Jul. 14, 2008.

Written Opinion—PCT/US07/088757, International Search Authority—European Patent Office—Munich—Jul. 14, 2008.

* cited by examiner

Pattern A:

I — increasing if Val $[A_x]$ − Val $[A_0]$ > +Threshold

D — decreasing if Val $[A_x]$ − Val $[A_0]$ < Threshold

N — neither otherwise.

|  | $P_A1$ | $P_A2$ | $P_A3$ | $P_A4$ | $P_A5$ | $P_A6$ | $P_A7$ | $P_A8$ |
|---|---|---|---|---|---|---|---|---|
| STRING PATTERN $A_{I1}$: | N | I | I | I | I | I | I | I |
| STRING PATTERN $A_{I2}$: | I | N | I | I | I | I | I | I |
| STRING PATTERN $A_{I3}$: | I | I | N | I | I | I | I | I |
| STRING PATTERN $A_{I4}$: | I | I | I | N | I | I | I | I |
| STRING PATTERN $A_{I5}$: | I | I | I | I | N | I | I | I |
| STRING PATTERN $A_{I6}$: | I | I | I | I | I | N | I | I |
| STRING PATTERN $A_{I7}$: | I | I | I | I | I | I | N | I |
| STRING PATTERN $A_{I8}$: | I | I | I | I | I | I | I | N |

FIG. 4

|  | $P_A1$ | $P_A2$ | $P_A3$ | $P_A4$ | $P_A5$ | $P_A6$ | $P_A7$ | $P_A8$ |
|---|---|---|---|---|---|---|---|---|
| STRING PATTERN $A_{D1}$: | N | D | D | D | D | D | D | D |
| STRING PATTERN $A_{D2}$: | D | N | D | D | D | D | D | D |
| STRING PATTERN $A_{D3}$: | D | D | N | D | D | D | D | D |
| STRING PATTERN $A_{D4}$: | D | D | D | N | D | D | D | D |
| STRING PATTERN $A_{D5}$: | D | D | D | D | N | D | D | D |
| STRING PATTERN $A_{D6}$: | D | D | D | D | D | N | D | D |
| STRING PATTERN $A_{D7}$: | D | D | D | D | D | D | N | D |
| STRING PATTERN $A_{D8}$: | D | D | D | D | D | D | D | N |

FIG. 5

$P_{(E/F)}1 \quad P_{(E/F)}2 \quad P_{(E/F)}3 \quad P_{(E/F)}4$

Pattern E:
I - increasing if Val $[E_{n+1}]$ – Val $[E_n]$ > +Threshold

D – decreasing if Val $[E_{n+1}]$ – Val $[E_n]$ < Threshold

N – neither otherwise.

Pattern F:
I - increasing if Val $[F_{n+1}]$ – Val $[F_n]$ > +Threshold

D – decreasing if Val $[F_{n+1}]$ – Val $[F_n]$ < Threshold

N – neither otherwise.

$P_{(G/H)}1$  $P_{(G/H)}2$  $P_{(G/H)}3$  $P_{(G/H)}4$

Pattern G:

I - increasing if Val $[G_{n+1}]$ – Val $[G_0]$ > +Threshold

D – decreasing if Val $[G_{n+1}]$ – Val $[G_0]$ < Threshold

N – neither otherwise.

Pattern H:

I - increasing if Val $[H_{n+1}]$ – Val $[H_0]$ > +Threshold

D – decreasing if Val $[H_{n+1}]$ – Val $[H_0]$ < Threshold

N – neither otherwise.

X = Any

PROGRAMMABLE PATTERN MATCHING DEVICE

BACKGROUND

1. Field

Various examples pertain to digital image processing and in particular to methods for soft edge detection, adaptive noise filtering, bad pixel correction, and bad cluster correction.

2. Background

Digital cameras have become widespread and can be found in many different types of devices. A common problem in obtaining images with digital cameras is degradation of the captured image due to the limited resolution of the camera, defects in the image capturing sensors, focusing problems, and/or foreign particles in front of the image capturing sensors. Techniques have been developed to process a captured image to correct and/or minimize the effect of such degradation. Such image processing/correction techniques typically use significant processing resources and process the whole image. However, in many digital camera implementations, processor resources are limited and conventional image processing and correction techniques and/or algorithms are difficult to implement without noticeable delays.

Thus, efficient image processing and correction methods are needed that can be implemented with limited processing resources and without noticeable delays.

SUMMARY

A method is provided for detecting a bad photosensor in an image capturing device. A first photosensor is identified in a grid of photosensors and its associated first pixel value is obtained. A first plurality of photosensors surrounding the first photosensor is identified and pixel values associated with the first plurality of photosensors is obtained. The first plurality of photosensors may have the same color sensitivity as the first photosensor. The first pixel value is subtracted from the first plurality of photosensor pixel values to obtain a first set of pixel value differences. Each of the differences in the first set of pixel value differences is classified based on their individual magnitude and sign to generate a first string pattern. The first string pattern is compared to one or more predefined string patterns indicative of a bad photosensor. The first photosensor may be identified as bad if all the pixel value differences in the first set of pixel value differences have the same classification. A bad first photosensor may be fixed or compensated by averaging the pixel values of the first plurality of photosensors to obtain an adjusted pixel value that blends with the neighboring pixel values.

Additional photosensors from the first plurality of photosensors may be queried to determine whether they are bad. This may be done by determining whether a first pixel value difference in the first set of pixel value differences is classified differently from the remaining first set of pixel value differences. A second photosensor associated with the first pixel value difference is identified and its associated second pixel value is obtained. The second pixel value is subtracted from other pixel values associated with a second plurality of photosensors to obtain a second set of pixel value differences. Each difference in the second set of pixel value differences is classified based on their individual magnitude and sign to generate a second string pattern. A determination is made as to whether the second string pattern is indicative of a bad second photosensor.

A pattern matching device is also provided comprising a storage device and a processing device. The storage device may store a bad pixel pattern library including a plurality of predefined string patterns indicative of a bad pixel. The processing circuit may be configured to identify a first photosensor in a grid of photosensors and obtain its associated first pixel value. A first plurality of photosensors surrounding the first photosensor is also identified and their pixel values are obtained. The first plurality of photosensors may have the same color sensitivity as the first photosensor. The first pixel value is subtracted from the first plurality of photosensor pixel values to obtain a first set of pixel value differences. Each of the differences in the first set of pixel value differences is then classified based on their individual magnitude and sign to generate a first string pattern. The first string pattern is then compared to one or more of the plurality of predefined string patterns indicative of a bad photosensor. The first photosensor may be identified as bad if all the pixel value differences in the first set of pixel value differences have the same classification.

To identify a bad pixel cluster, the processing circuit determines whether a first pixel value difference in the first set of pixel value differences is classified differently from the remaining first set of pixel value differences. A second photosensor associated with the first pixel value difference may be identified and its associated second pixel value obtained. The second pixel value is subtracted from other pixel values associated with a second plurality of photosensors to obtain a second set of pixel value differences. Each difference in the second set of pixel value differences is classified based on their individual magnitude and sign to generate a second string pattern. A determination may then be made as to whether the second string pattern is indicative of a bad second photosensor.

Consequently, a pattern matching device is also provided comprising: means for identifying a first photosensor in a grid of photosensors and obtaining its associated first pixel value; means for identifying a first plurality of photosensors surrounding the first photosensor and obtaining pixel values associated with the first plurality of photosensors, the first plurality of photosensors having the same color sensitivity as the first photosensor; means for subtracting the first pixel value from the first plurality of photosensor pixel values to obtain a first set of pixel value differences; means for classifying each of the differences in the first set of pixel value differences based on their individual magnitude and sign to generate a first string pattern; means for comparing the first string pattern to one or more predefined string patterns indicative of a bad photosensor; and/or means for identifying the first photosensor as bad if all the pixel value differences in the first set of pixel value differences have the same classification.

A computer-readable medium is also provided having one or more instructions for matching strings of pixel patterns, which when executed by a processor causes the processor to: identify a first photosensor in a grid of photosensors and obtaining its associated first pixel value; identify a first plurality of photosensors surrounding the first photosensor and obtaining pixel values associated with the first plurality of photosensors, the first plurality of photosensors having the same color sensitivity as the first photosensor; subtract the first pixel value from the first plurality of photosensor pixel values to obtain a first set of pixel value differences; classify each of the differences in the first set of pixel value differences based on their individual magnitude and sign to generate a first string pattern; compare the first string pattern to one or more predefined string patterns indicative of a bad photosensor; identify the first photosensor as bad if all the pixel value differences in the first set of pixel value differences have the same classification; and/or compensate for a bad first photosensor by averaging the pixel values of the first plurality of photosensors to obtain an adjusted pixel value that blends with the neighboring pixel values.

Another aspect provides for soft edge and/or hard edge detection within an image. For instance, a first pixel area within an image is defined. Adjacent pixel values are subtracted from each other along a first line (e.g., diagonal, row or column) of the first pixel area to obtain a first set of pixel value differences. Each of the differences in the first set of pixel value differences is classified based on their individual magnitude and sign to generate a first string pattern. The first string pattern is then compared to one or more predefined string patterns indicative of a soft edge. The pixels along the first line may be identified as a soft edge transition if the first string pattern matches one of the one or more predefined string patterns indicative of a soft edge. One or more of the pixel values for the pixels along the first line may be enhanced to sharpen the soft edge. The whole image may be scanned for matching string patterns indicative of a soft edge by defining additional pixel areas that overlap each other by one or more pixels.

The operations of classifying the first set of pixel value differences may include obtaining a minimum pixel threshold value. A first difference in the first set of pixel value differences may be classified as a first class if it is greater than the positive minimum pixel threshold value. The difference in the first set of pixel value differences may be classified as a second class if it is less than the negative minimum pixel threshold value. The difference in the first set of pixel value differences is classified as a third class otherwise. The pixels along the first line are identified as a soft edge transition if the differences in the first set of pixel value differences are either all positive or all negative.

Similarly, this method may serve to identify a hard edge in an image. A first pixel area is defined within an image. A first pixel value along the first line of the pixel area is subtracted from other pixel values along the first line to obtain a first set of pixel value differences. Each of the differences in the first set of pixel value differences is classified based on their individual magnitude and sign to generate a first string pattern The first string pattern is compared to one of one or more predefined string patterns indicative of a hard edge. One or more pixels along the first line may then be identified as a hard edge transition if the first string pattern matches one of the one or more predefined string patterns indicative of a hard edge.

In various configurations of hard and/or soft edge detection, the first line may be either a diagonal, vertical or horizontal line.

The process of identifying hard and/or soft edges may also be performed on a second line. Adjacent pixel values are subtracted from each other along a second line of the first pixel area to obtain a second set of pixel value differences. Each of the differences in the second set of pixel value differences is classified based on their individual magnitude and sign to generate a second string pattern. The second string pattern is compared to one or more predefined string patterns associated with a soft edge. The pixels along the second line are identified as a soft edge transition if the second string pattern matches one of the one or more predefined string patterns. The second line may be substantially orthogonal the first line.

Similarly, this process may be used to identify hard edges in an image. A first pixel value along the first line of the pixel area is subtracted from other pixel values along the first line to obtain a second set of pixel value differences. Each of the differences in the second set of pixel value differences is classified based on their individual magnitude and sign to generate a second string pattern. The second string pattern is compared to one or more predefined string patterns indicative of a hard edge. One or more pixels along the first line may be identified as a hard edge transition if the second string pattern matches one of the one or more predefined string patterns. The one or more of the pixels identified as a hard edge may be prevented from being enhanced.

A pattern matching device may also be provided for detecting hard and/or soft edges in an image, including a storage device and a processing circuit. The storage device may store a soft edge string pattern library including one or more predefined string patterns indicative of a soft edge. The processing circuit may be configured to define a first pixel area within an image; subtract adjacent pixel values from each other along a first line of the first pixel area to obtain a first set of pixel value differences; classify each of the differences in the first set of pixel value differences based on their individual magnitude and sign to generate a first string pattern; comparing the first string pattern to the one or more predefined string patterns indicative of a soft edge; identify the pixels along the first line as a soft edge transition if the first string pattern matches one of the one or more predefined string patterns; enhance one or more of the pixel values for the pixels along the first line to sharpen the soft edge; and/or scan the whole image for matching string patterns indicative of a soft edge by defining additional pixel areas that overlap each other by one or more pixels.

Consequently, a pattern matching device is provided comprising: means for defining a first pixel area within an image; means for subtracting adjacent pixel values from each other along a first line of the first pixel area to obtain a first set of pixel value differences; means for classifying each of the differences in the first set of pixel value differences based on their individual magnitude and sign to generate a first string pattern; means for comparing the first string pattern to one or more predefined string patterns indicative of a soft edge; means for identifying the pixels along the first line as a soft edge transition if the first string pattern matches one of the one or more predefined string patterns; means for enhancing one or more of the pixel values for the pixels along the first line to sharpen the soft edge; and/or means for scanning the whole image for matching string patterns indicative of a soft edge by defining additional pixel areas that overlap each other by one or more pixels.

The pattern matching device may also include: means for subtracting a first pixel value along the first line of the pixel area from other pixel values along the first line to obtain a second set of pixel value differences; means for classifying each of the differences in the second set of pixel value differences based on their individual magnitude and sign to generate a second string pattern; means for comparing the second string pattern to one or more predefined string patterns indicative of a hard edge; means for identifying one or more pixels along the first line as a hard edge transition if the second string pattern matches one of the one or more predefined string patterns; and/or means for preventing one or more of the pixels identified as a hard edge from being enhanced.

A computer-readable medium is also provided having one or more instructions for soft edge detection by matching strings of pixel patterns, which when executed by a processor causes the processor to: define a first pixel area within an image; subtract adjacent pixel values from each other along a first line of the first pixel area to obtain a first set of pixel value differences; classify each of the differences in the first set of pixel value differences based on their individual magnitude and sign to generate a first string pattern; compare the first string pattern to one or more predefined string patterns indicative of a soft edge; identify the pixels along the first line as a soft edge transition if the first string pattern matches one of the one or more predefined string patterns; enhance one or more of the pixel values for the pixels along the first line to sharpen the soft edge; and/or scan the whole image for matching string patterns indicative of a soft edge by defining additional pixel areas that overlap each other by one or more pixels.

The computer-readable medium is also provided having one or more instructions for hard edge detection by matching strings of pixel patterns, which when executed by a processor causes the processor to: subtract a first pixel value along the first line of the pixel area from other pixel values along the first line to obtain a second set of pixel value differences; classify each of the differences in the second set of pixel value differences based on their individual magnitude and sign to generate a second string pattern; compare the second string pattern to one or more predefined string patterns indicative of a hard edge; identify one or more pixels along the first line as a hard edge transition if the second string pattern matches one of the one or more of predefined string patterns indicative of a hard edge; and/or prevent one or more of the pixels identified as a hard edge from being enhanced.

BRIEF DESCRIPTION OF THE DRAWINGS

FIGS. 4 and 5 illustrate possible string patterns that may indicate a bad photosensor or pixel cluster.

DETAILED DESCRIPTION

Figure 1:
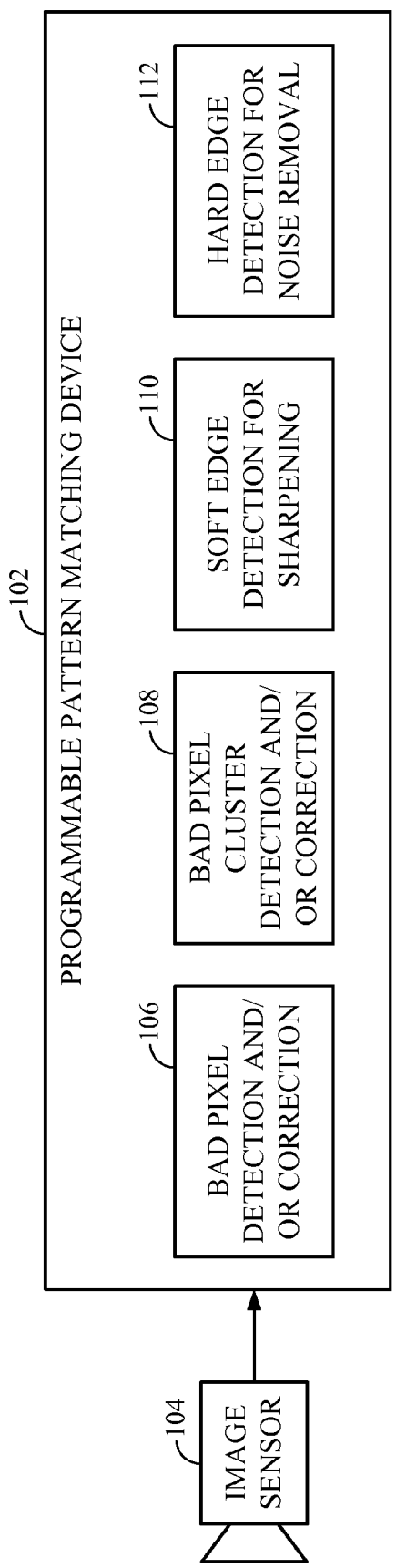
FIG. 1 is a block diagram illustrating a programmable pattern matching device according to one example.

In the following description, specific details are given to provide a thorough understanding of the examples. However, it will be understood by one of ordinary skill in the art that the examples may be practiced without these specific details. For example, circuits may not be shown in block diagrams in order not to obscure the examples in unnecessary detail.

Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be inluded within the scope of computer-readable media.

Moreover, a storage medium may represent one or more devices for storing data, including read-only memory (ROM), random access memory (RAM), magnetic disk storage mediums, optical storage mediums, flash memory devices, and/or other computer-readable mediums for storing information.

Furthermore, various configurations may be implemented by hardware, software, firmware, middleware, microcode, or a combination thereof. When implemented in software, firmware, middleware, or microcode, the program code or code segments to perform the necessary tasks may be stored in a computer-readable medium such as a storage medium or other storage means. A processor may perform the defined tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others. The methods disclosed herein may be implemented in hardware, software, or both.

One feature provides a method for identifying soft edges of an image and adaptively sharpening those edges. Soft edges are identified by subtracting adjacent pixel values along a diagonal, row and/or column, generating a pixel string pattern based on the pixel value differences, and comparing the pixel string pattern to predefined string patterns indicative of a soft edge. Similarly, hard edges may be identified by comparing the pixel string pattern to predefined string patterns indicative of a hard edge.

Another feature provides a method for detecting bad photosensors or pixels in an image sensor. For the pixel value for a first photosensor is subtracted from its surrounding photosensors to obtain a pixel string pattern. The pixel string pattern is then compared to predefined string patterns indicative of a bad pixel.

FIG. 1 is a block diagram illustrating a programmable pattern matching device 102 according to one example. The programmable pattern matching device 102 may be incorporated into an image capturing device, such as a camera, mobile phone, or any other device having image-capturing and/or processing capabilities, and may be configured to perform one or more image detection, correction, sharpening, and/or filtering functions. For example, the image capturing device may include an image sensor 104 that converts a visual image into an electrical signal. The image sensor 104 may include a plurality of photosensors or pixel sensors, such as charged-coupled devices (CCD) or complementary metal-oxide-semiconductor (CMOS) sensors, arranged in an array. For instance, the photosensors may be configured as a Bayer filter, Foveon X3 sensor, or a trichroic prism assembly (3CCD), among other configurations. The photosensors obtain sampled pixel values that form a digital image.

The programmable pattern matching device 102 may be configured to assist the image capturing and/or processing by providing pixel correction and/or detection functions. For example, it may perform (1) bad pixel detection and/or correction, (2) bad pixel cluster detection and/or correction, (3) soft edge detection and/or correction, and/or (4) hard edge detection.

Bad Pixel Detection and/or Correction

Figure 2:
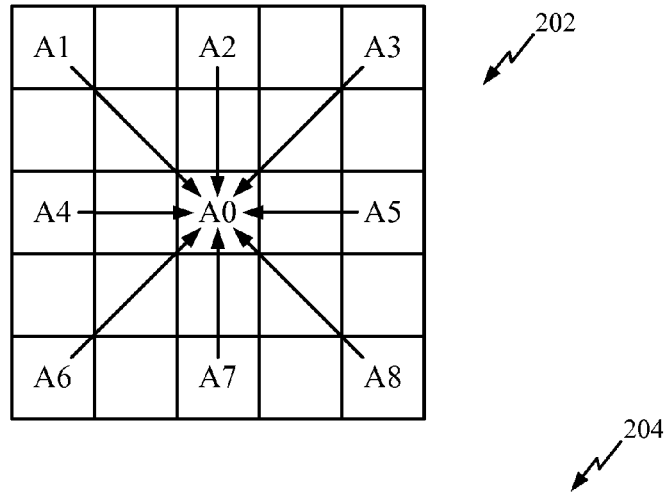
FIG. 2 illustrates a method that may be implemented by a programmable pattern matching device to detect and/or correct bad pixels of an image sensor.

FIG. 2 illustrates a method that may be implemented by a programmable pattern matching device to detect and/or correct bad pixels of an image sensor. In this example, a selected pixel grid 202 of pixel values A0, A1, A2, A3, A4, A5, A6, A7, and A8 (e.g., Bayer data) is obtained. A pixel value Ax may be a certain pixel characteristic (e.g., color, intensity, luma, chroma, etc.) represented as an absolute or relative measurement for a particular photosensor or pixel. The selected pixel grid 202 may include a subset of the photosensors in the image sensor. In this example, the pixel values A0, A1, A2, A3, A4, A5, A6, A7, and A8 are associated with photosensors having the same color sensitivity, e.g., green photosensors, arranged in a Bayer filter pattern. Pixel value A0 corresponds to a first photosensor at the center of the pixel grid 202, and pixel values A1, A2, A3, A4, A5, A6, A7, and A8 correspond to photosensors surrounding that first photosensor as illustrated.

A string pattern A 204 is defined as the difference between each pixel value A1, A2, A3, A4, A5, A6, A7, and A8 and pixel value A0. These differences may be represented as a pattern value $P_A x$. A string pattern A 204 may be defined by a plurality of pattern values $P_A x$. That is, $P_A 1 = A1 - A0$, $P_A 2 = A2 - A0$, $P_A 3 = A3 - A0$, $P_A 4 = A4 - A0$, $P_A 5 = A5 - A0$, $P_A 6 = A6 - A0$, $P_A 7 = A7 - A0$, and $P_A 8 = A8 - A0$. If the difference between a pixel value Ax and A0 is greater than a threshold value (+Threshold), then the corresponding pattern value $P_A x$ is said to be increasing (I). Similarly, if the difference between a pixel value Ax and A0 is less than the negative of the threshold value (−Threshold), then the corresponding pattern value $P_A x$ is said to be decreasing (D). Otherwise, if the difference between a pixel value Ax and A0 is less than the threshold value (+Threshold) and more than the negative threshold value (−Threshold), then the corresponding pattern value $P_A x$ is said to be neutral (N). Thus, the string pattern A 204 is obtained as a string of $P_A 1$, $P_A 2$, $P_A 3$, $P_A 4$, $P_A 5$, $P_A 6$, $P_A 7$, and $P_A 8$.

To determine whether the first photosensor or pixel corresponding to value A0 is bad, two string patterns $A_D$ 206 and $A_I$ 208 are of interest. If the differences between pixel value A0 and its surrounding pixel values A1, A2, A3, A4, A5, A6, A7 and A8 are labeled as decreasing (D), then pattern $A_D$ 206 is obtained. Similarly, if the differences between pixel value A0 and its surrounding pixel values A1, A2, A3, A4, A5, A6, A7 and A8 are labeled as increasing (I), then pattern $A_I$ 208 is obtained. If either pattern $A_D$ 206 or pattern $A_I$ 208 is obtained, then the first photosensor or pixel corresponding to value A0 is said to be bad. That is, since the surrounding pixel values A1, A2, A3, A4, A5, A6, A7 and A8 are all either greater than or less than pixel value A0 by a minimum threshold value, it is assumed that the first photosensor or pixel in the image sensor is bad.

In general, the examples presented herein categorize changes between pixels as a set of three symbols (e.g., "D", "N", and "I") indicating the relative relationship between adjacent pixel values (e.g., pixel values surrounding pixel value A0). The symbols may then be combined in a string 204 that can then be compared to a dictionary of predetermined strings (e.g., patterns 206 and 208) that may be indicative of a bad pixel, for example. A fewer number or greater number of symbols may also be used in alternative configurations to achieve the same purpose. That is, the string pattern 204 and/or the predetermined string patterns 206 and/or 208 may have more or fewer symbols.

Once the programmable pattern matching device has identified the first photosensor or pixel as being bad, its corresponding pixel value A0 may be changed to a corrected value based on the surrounding pixel values A1, A2, A3, A4, A5, A6, A7 and A8. The programmable pattern matching device may be configured to quickly identify such bad photosensors or pixels in an image sensor by performing simple subtraction operations on a selected pixel grid 202. The whole image sensor may be scanned for bad pixels by using overlapping pixel grids and performing this method on each of those grids.

According to one feature, the programmable pattern matching device may perform this bad pixel detection upon startup of a camera to identify the bad pixels in an image sensor. It can then build a record of bad or table pixels that may be ignored and/or corrected based on neighboring pixel values.

Additionally, this bad pixel detection and/or correction method may also be applied all photosensors of an image sensor. For instance, the method illustrated in FIG. 2 may be applied to green photosensors, blue photosensors, and red photosensors of an image sensor. In each instance, a photosensor being tested (i.e., corresponding to pixel value A0) is tested against surrounding photosensors having the same color sensitivity.

Figure 3:
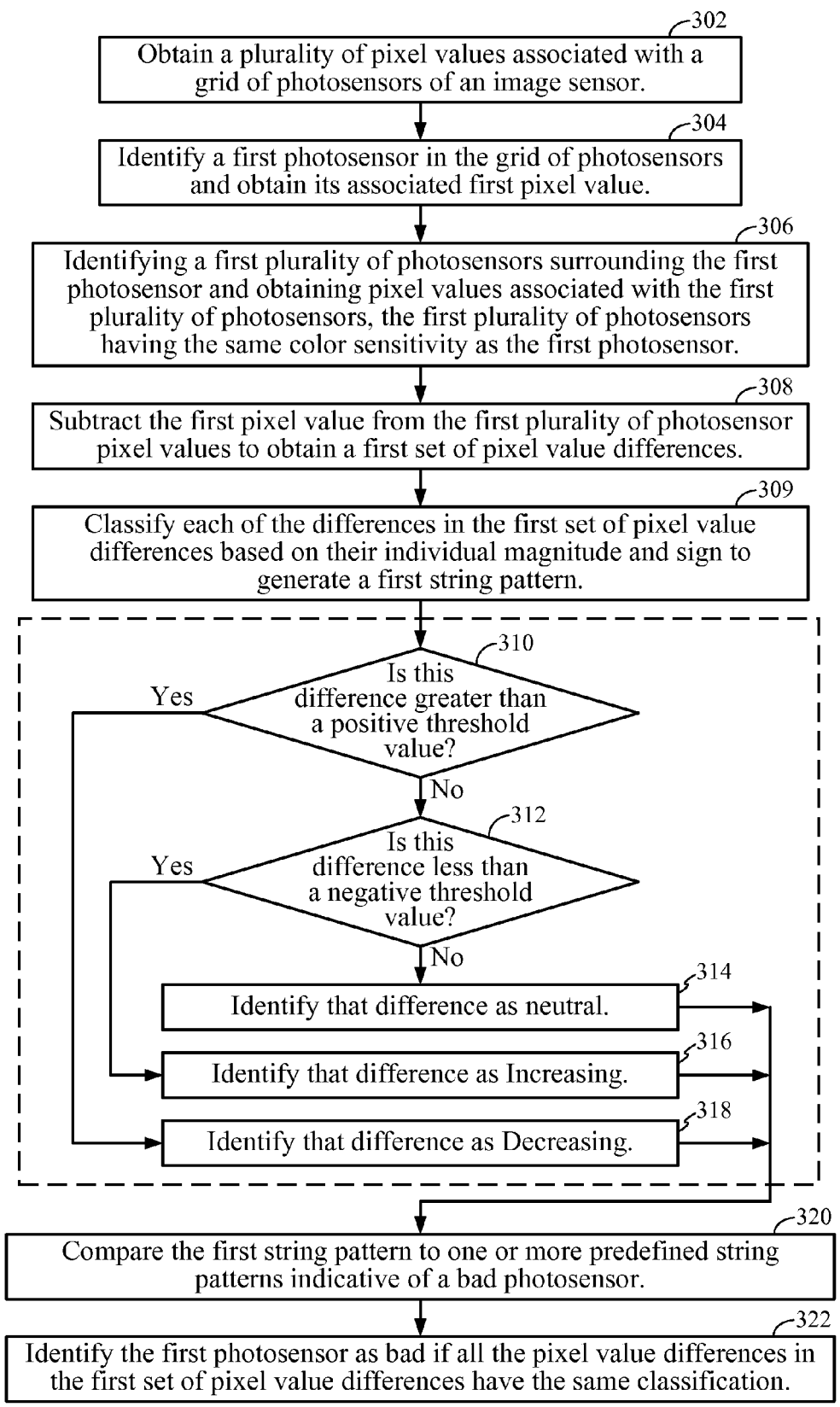
FIG. 3 is a flow diagram illustrating a method for performing bad pixel detection and/or correction.

FIG. 3 is a flow diagram illustrating a method for performing bad pixel detection and/or correction. A plurality of pixel values, associated with a grid of photosensors or pixels of an image sensor, are obtained 302. A first photosensor in the grid of photosensors is identified and its associated first pixel value is obtained 304. A first plurality of photosensors surrounding the first photosensor are identified and pixel values associated with the first plurality of photosensors are obtained, the first plurality of photosensors having the same color sensitivity as the first photosensor 306. The first pixel value is subtracted from the first plurality of photosensor pixel values to obtain a first set of pixel value differences 308.

Each of the differences in the first set of pixel value differences is classified based on their individual magnitude and sign to generate a first string pattern. For example, a determination is made on whether the difference is greater than a positive threshold value 310. If so, that difference is identified as Increasing 318. Otherwise, a determination is made on whether the difference is less than a negative threshold value 312. If so, that difference is identified as Decreasing 316. Otherwise, the difference is identified as neutral 314. These difference calculations may be performed in series or in parallel.

The first string pattern is compared to one or more predefined string patterns indicative of a bad photosensor 320. For instance, the first photosensor is identified as bad if all the pixel value differences in the first set of pixel value differences have the same classification (e.g., the same sign and a magnitude greater than a minimum threshold value, all Increasing or all Decreasing) 322. This bad photosensor (pixel) information may be stored to correct other captured images.

A bad photosensor may be "corrected" by averaging the pixel values of its surrounding photosensors to obtain a pixel value that blends with the neighboring pixel values or simply by taking one of the neighboring pixels' value as a replacement for the defective pixel value.

Bad Cluster Detection and/or Correction

The methods illustrated in FIGS. 2 and 3 for be expanded to identify bad pixel clusters, where two or more adjacent photosensor of the same color sensitivity may be bad. In particular, these methods may generate a string pattern where just one of the pattern values $P_A x$ is distinct from all other pattern values. For example, FIG. 4 illustrates eight possible string patterns $A_{I1}$, $A_{I2}$, $A_{I3}$, $A_{I4}$, $A_{I5}$, $A_{I6}$, $A_{I7}$, and $A_{I8}$ in which seven out of eight pattern values (or pixel value differences) have been identified as Increasing while the remaining pattern value (or pixel value difference) has been identified as Neutral. Similarly, FIG. 5 illustrates another example of eight possible string patterns $A_{D1}$, $A_{D2}$, $A_{D3}$, $A_{D4}$, $A_{D5}$, $A_{D6}$, $A_{D7}$, and $A_{D8}$ in which seven out of eight pattern values (or pixel value differences) have been identified as Decreasing (D) while the remaining pattern value (or pixel value difference) has been identified as Neutral (N). Because one of the "surrounding" photosensors may also be bad, the programmable pattern matching device may also be configured to determine whether a photosensor having a pattern value (or pixel value difference) that is different from the other surrounding photosensors is also bad photosensor.

Figure 6:
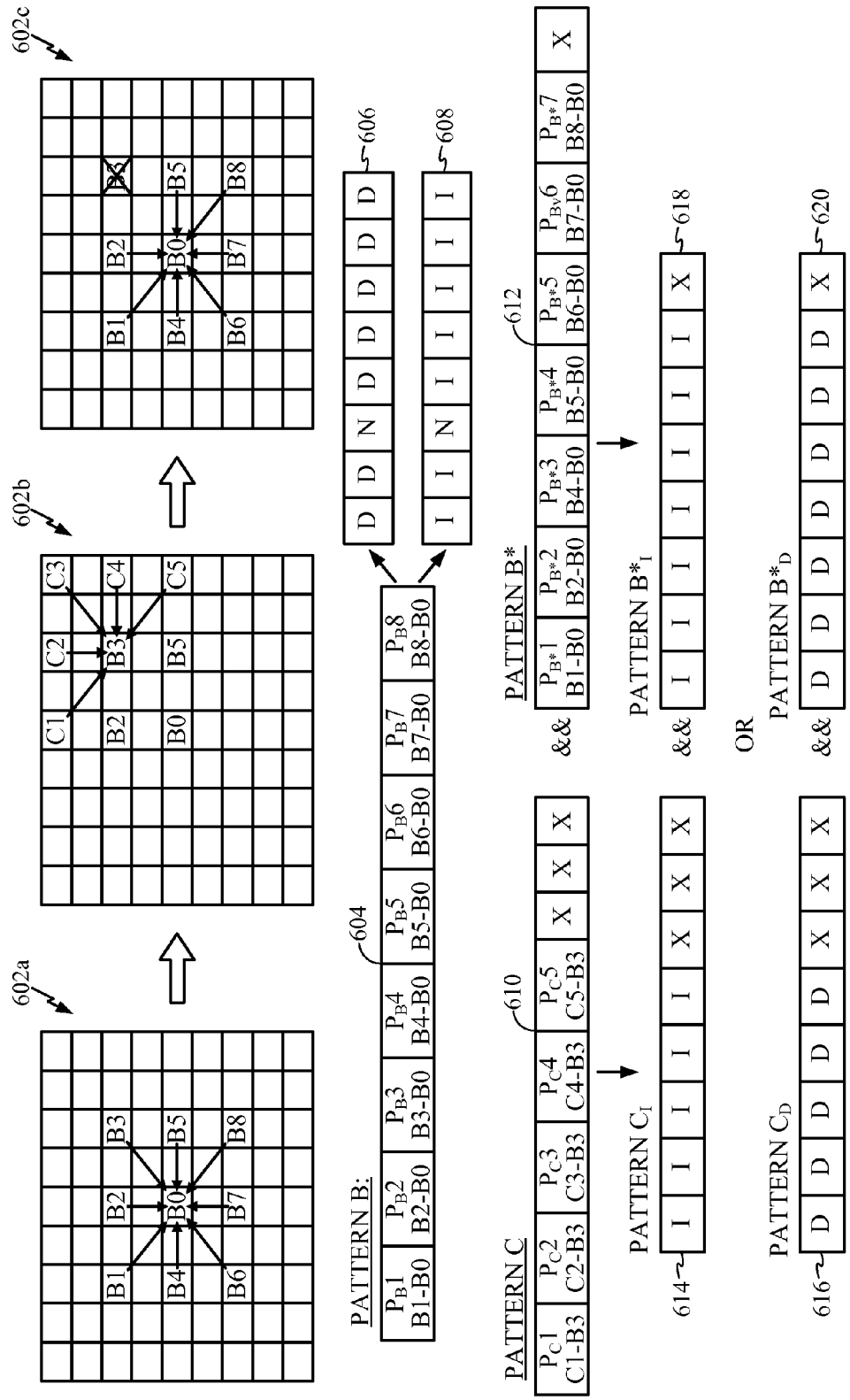
FIG. 6 illustrates a method for detecting bad pixel clusters.

FIG. 6 illustrates a method for detecting bad pixel clusters. In this example, a selected pixel grid 602 having pixel values B0, B1, B2, B3, B4, B5, B6, B7, and B8 (e.g., Bayer data) is obtained. Pixel values B0, B1, B2, B3, B4, B5, B6, B7, and B8 may be associated with corresponding photosensors having the same color sensitivity, e.g., green photosensors, arranged in a Bayer filter pattern. Pixel value B0 corresponds to a first photosensor being tested on the pixel grid 602, and pixel values B1, B2, B3, B4, B5, B6, B7, and B8 correspond to photosensors surrounding that first photosensor as illustrated.

In this example, a string pattern B 604 is obtained from pixel grid 602a. A pattern value $P_B x$ may be obtained as illustrated in FIG. 2. In the case where the photosensors (or pixels) associated with pixels values B0 and B3 are both bad or faulty photosensors (or pixels), the pattern value $P_B 3$ may be neutral (N). For instance, string pattern 606 is generated if pattern values $P_B 1$, $P_B 2$, $P_B 4$, $P_B 5$, $P_B 6$, $P_B 7$, and $P_B 8$ are all considered Decreasing and string pattern 608 is generated if these same pattern values are considered Increasing. Such string patterns 606 and 608 may indicate that the photosensors associated with pixel values B0 and B3 are both bad or faulty. Therefore, a second operation is performed to determine whether a second photosensor associated with pixel value B3 is bad.

Pixel grid 602b illustrates how the second photosensor, associated with pixel value B3, is compared to its surrounding photosensors to determine whether it is good or bad. However, surrounding photosensors whose pixel values were used to in obtaining string pattern B 604 are excluded. For example, a string pattern C 610 is defined for the second photosensor as the difference between pixel value B3 and each surrounding photosensor pixel value C1, C2, C3, C4, and C5, excluding pixel values B0, B2, and B5. That is, $P_C 1=C1-B3$, $P_C 2=C2-B3$, $P_C 3=C3-B3$, $P_C 4=C4-B3$, and $P_C 5=C5-B3$. The string pattern C 610 may be defined using Decreasing (D), Increasing (I), or Neutral (N) indicators as described in FIG. 2. The last three pattern values $P_C 6$, $P_C 7$, and $P_C 8$ in string pattern C 610 are marked as null or ignored.

Pixel grid 602c illustrates how the string pattern B 610 may be regenerated as a new string pattern B* 612 to take into account the bad second photosensor corresponding to pixel value B3. That is, the new string pattern B* 612 is defined as $P_{B*} 1=B1-B0$, $P_{B*} 2=B2-B0$, $P_{B*} 3=B4-B0$, $P_{B*} 4=B5-B0$, $P_{B*} 5=B6-B0$, $P_{B*} 6=B7-B0$, and $P_{B*} 7=B8-B0$. The last pattern value $P_{B*} 8$ in string pattern B* 610 is marked as null or ignored.

Having identified one or more bad or faulty surrounding photosensors or pixels (e.g., the second photosensor associated with pixel value B3), their corresponding pixel values (i.e., B3) may be excluded when determining whether another adjacent photosensor (e.g., the first photosensor associated with pixel value B0) is good or bad. For example, the programmable pattern matching device may mark the first photosensor (associated with pixel value B0) as faulty or bad if either (1) both string pattern $C_I$ 614 and string pattern $B*_I$ are found to be Increasing (I), or (2) both string pattern $C_D$ 616 and string pattern $B*_D$ are found to be Decreasing (D).

Figure 7:
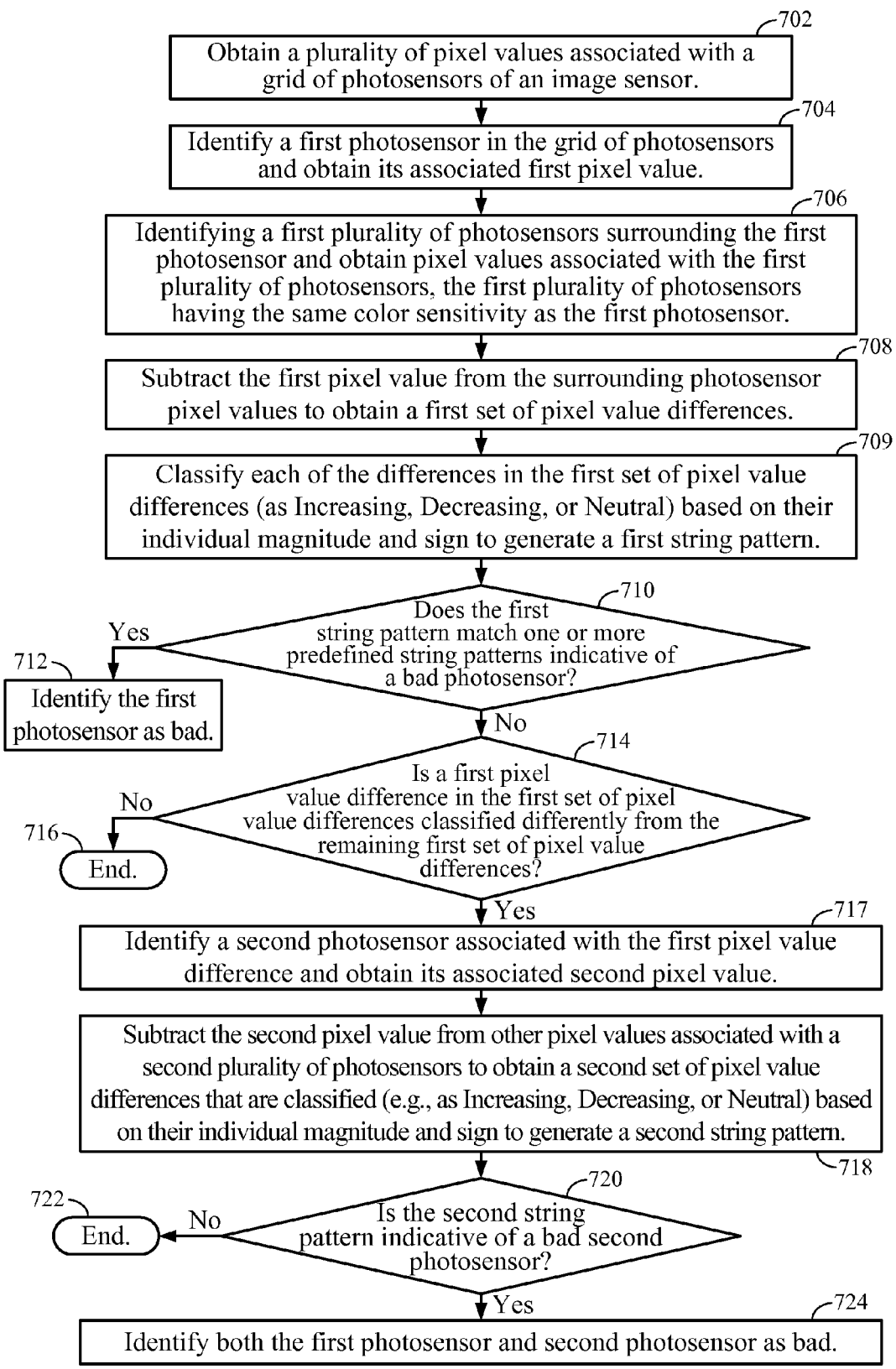
FIG. 7 illustrates a method for detecting bad pixel clusters according to one example.

FIG. 7 illustrates a method for detecting bad pixel clusters according to one example. A plurality of pixel values, associated with a grid of photosensors of an image sensor, are obtained 702. A first photosensor in the grid of photosensors is identified and an associated first pixel value is obtained 704. A first plurality of photosensors surrounding the first photosensor is identified and pixel values associated with the first plurality of photosensors is obtained, the first plurality of photosensors having the same color sensitivity as the first photosensor 706. The first pixel value is subtracted from the surrounding photosensor pixel values to obtain a first set of pixel value differences 708. Each of the differences in the first set of pixel value differences is classified (e.g., as Increasing, Decreasing, or Neutral) based on their individual magnitude and sign to generate a first string pattern 709. The pixel value differences may be identified as Increasing, Decreasing, or Neutral by comparing each difference to a positive threshold value and a negative threshold value as described in FIG. 2.

The first string pattern is then compared to one or more predefined string patterns indicative of a bad photosensor 710. For instance, if all differences in the first set of pixel value differences have the same classification (e.g., all have the same sign and a magnitude greater than a minimum threshold value, increasing or decreasing), then the first photosensor is identified as bad 712. Otherwise, a determination is made as to whether one or more of the surrounding photosensors is also bad. For instance, a determination is made as to whether a first pixel value difference in the first set of pixel value differences is classified differently from the remaining first set of pixel value differences 714. This may be done, for example, by comparing the first string pattern to predefined string patterns. If such differently classified first pixel value difference is not present, then the process ends 716 since it may be difficult to ascertain whether the first and/or second photosensor are bad. Otherwise, a second photosensor associated with the first pixel value difference is identified and its associated second pixel value is obtained 717.

The second pixel value is subtracted from other pixel values associated with a second plurality of photosensors (having the same color sensitivity and surrounding the second photosensor) to obtain a second set of pixel value differences that are classified (e.g., as Increasing, Decreasing, or Neutral) based on their individual magnitude and sign to generate a second string pattern 718. Note that in obtaining the second set of pixel value differences, pixel values used in obtaining the first set of pixel value differences may be excluded. A determination is then made on whether the second string pattern is indicative of a bad second photosensor. For example, if the second set of pixel value differences are all classified the same as the remaining first set of pixel value differences (e.g., all Increasing or all Decreasing), then both the first and second photosensors are identified as bad 724. That is, if the second set of pixel value differences and remaining first set of pixel value differences all have the same sign and a magnitude greater than a minimum threshold value, then both the first and second photosensors may be identified as bad. Otherwise, the process ends 722 since it may be difficult to ascertain whether the first and/or second photosensors are bad.

In general, the examples presented herein categorize changes between pixels as a set of three symbols (e.g., "D", "N", and "I") indicating the relative relationship between adjacent pixel values. The symbols may then be combined in a string that can then be compared to a dictionary of predetermined strings that may be indicative of a bad pixel cluster, for example. A fewer number or greater number of symbols may also be used in the strings in alternative configurations to achieve the same purpose.

Soft Edge Detection and Sharpening

Figure 8:
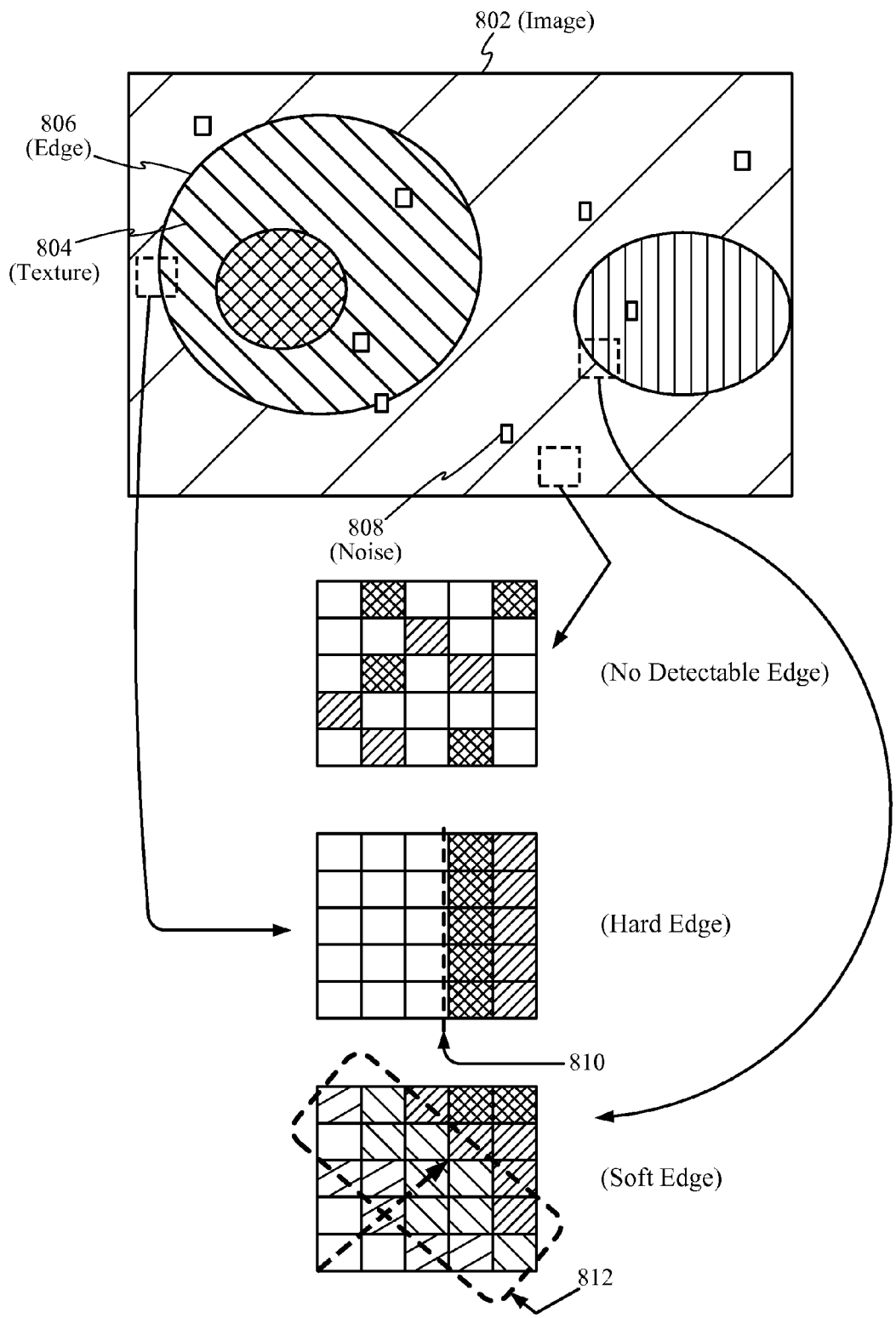
FIG. 8 illustrates the concept of edge detection according to one example.

FIG. 8 illustrates the concept of edge detection according to one example. An image 802 is a collection of textured areas 804 connected at the edges 806 where they meet. Noise 808 in an image 802 may be anywhere. Ideally, adaptive sharpening would not sharpen noise, would sharpen image texture and sharp edges some, and would sharpen blurry texture and soft edges the most. However, other than bad pixel correction (illustrated in FIGS. 1-7), it is difficult and/or inefficient to distinguish noise from texture. Therefore, a way is provided for identifying and distinguishing between soft edges 812, hard edges 810 and noise. A hard edge 810 may occur where a plurality of sequential pixels in an image exhibit a minimum hard-edge difference in certain pixel characteristics (e.g., color, intensity, luma, chroma, etc.) in comparison to adjacent pixels. Similarly, a soft edge 812 may occur where a plurality of sequential pixels in an image exhibit a minimum soft-edge difference in certain pixel characteristics (e.g., color, intensity, luma, chroma, etc.) in comparison to adjacent pixels. That is, a gradual change in a certain pixel characteristics among adjacent pixels in a line (e.g., in a diagonal, vertical, and/or horizontal line or direction) may indicate a soft edge 812. Pixels within the soft edge 812 may be sharpened to improve the image quality.

Figure 9:
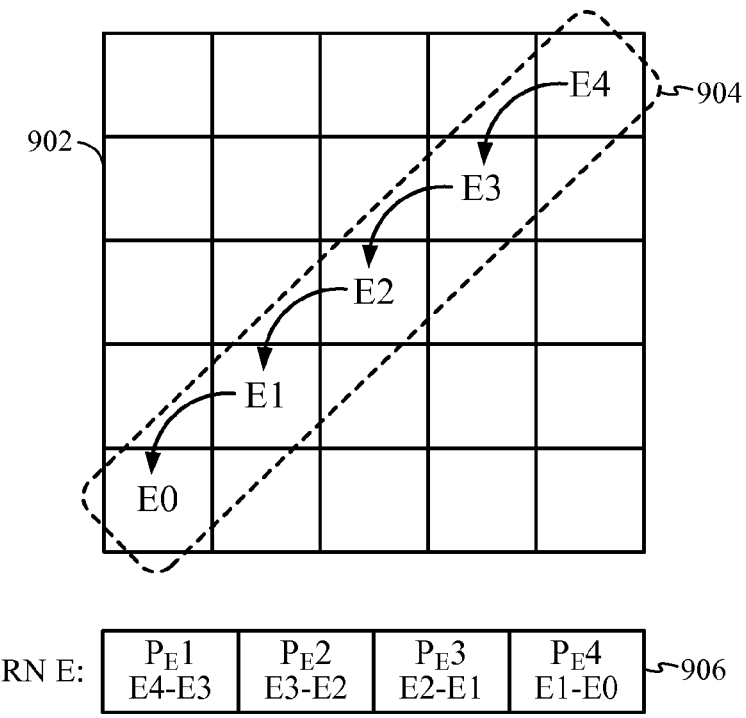
FIGS. 9 and 10 illustrate a method for scanning a selected region of an image to ascertain whether a soft edge is present.
Figure 10:
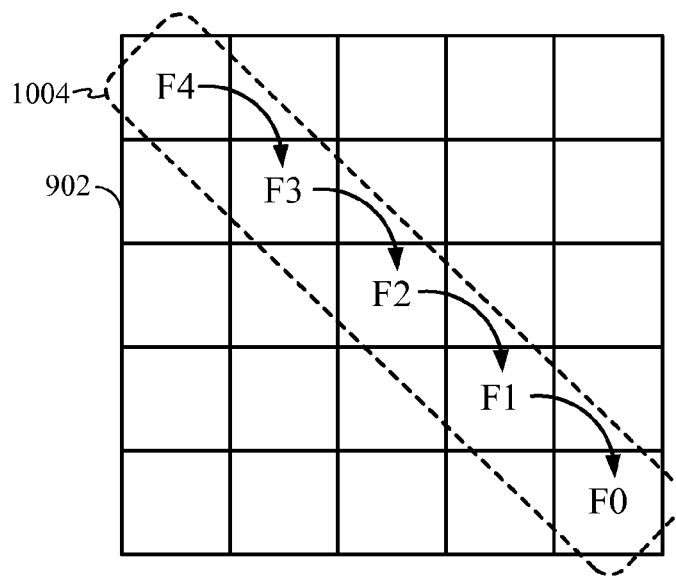

FIGS. 9 and 10 illustrate a method for scanning a selected region of an image to ascertain whether a soft edge is present. In one example, the image may be scanned in overlapping regions of five (5) pixels by five (5) pixels. For instance, each region may overlap an adjacent region by four pixel columns or four pixel rows. Pixels used for defining a region may be of the same color (e.g., all green, red, or blue).

For a selected pixel region 902, pixel value differences are obtained for adjacent pixels along a first diagonal 904 to obtain a string pattern E 906. That is, the new string pattern E 906 is defined as $P_E1=E4-E3$, $P_E2=E3-E2$, $P_E3=E2-E1$, and $P_E4=E1-E0$. If the difference between pixel values $E_{n+1}$ and $E_n$ is greater than a threshold value (+Threshold), then the corresponding pattern value $P_Ex$ is said to be increasing (I), where n is a positive integer between 0 and 4. Similarly, if the difference between pixel values $E_{n+1}$ and $E_n$ is less than the negative of the threshold value (-Threshold), then the corresponding pattern value $P_Ex$ is said to be decreasing (D). Otherwise, if the difference between pixel values $E_{n+1}$ and $E_n$ is less than the positive threshold value (+Threshold) and more than the negative threshold value (-Threshold), then the corresponding pattern value $P_Ex$ is said to be neutral (N).

Similarly, pixel value differences are obtained for adjacent pixels along a second diagonal 1004 of the selected pixel region 902 to obtain a string pattern F 1006. That is, the new string pattern F 1006 is defined as $P_F1=F4-F3$, $P_F2=F3-F2$, $P_F3=F2-F1$, and $P_F4=F1-F0$.

Figure 11:
FIG. 11 illustrates six string patterns that may indicate a soft edge.
Figure 11:
Figure 11:
Figure 11:
Figure 11:
Figure 11:

FIG. 11 illustrates six string patterns that may indicate a soft edge. String pattern 1102 exhibits a Neutral transition followed by three Decreasing transitions, indicating a progressive change in a pixel characteristic being compared (e.g., color, intensity, luma, chroma, etc.) among four adjacent pixels of an image. Similarly, string pattern 1104 exhibits consecutive Decreasing transitions indicating a progressive change in the pixel characteristic being compared (e.g., color, intensity, luma, chroma, etc.) among five adjacent pixels of an image. String pattern 1106 similarly exhibits three Decreasing transitions followed by a Neutral transition indicating a progressive change in the pixel characteristic being compared among four adjacent pixels of an image. Similarly, string patterns 1108, 1110, and 1112 are obtained where either five adjacent pixels exhibit Increasing transitions, or four adjacent pixels exhibit Increasing transitions with one Neutral transition at either end, indicating a progressive change in the pixel characteristic being compared (e.g., color, intensity, luma, chroma, etc.).

The number of consecutive or adjacent pixels exhibiting an Increasing or Decreasing pixel characteristic (e.g., color, intensity, luma, chroma, etc.) that should be present to be considered a soft edge may be based on the probability that a soft edge can be accurately identified based on that number of consecutive or adjacent pixels. Thus, this number may be modified or adjusted based on available processing power, image quality, and/or acceptable delays, among other factors.

In the example illustrated in FIG. 11, the choice has been made that a single Neutral transition at either end of the string pattern 1102, 1106, 1108, and 1112 is acceptable since the remaining transitions indicate a soft edge. However, a Decreasing to Increasing transition anywhere is unacceptable, in these examples, as this may indicate a hard edge rather than a soft edge.

Figure 12:
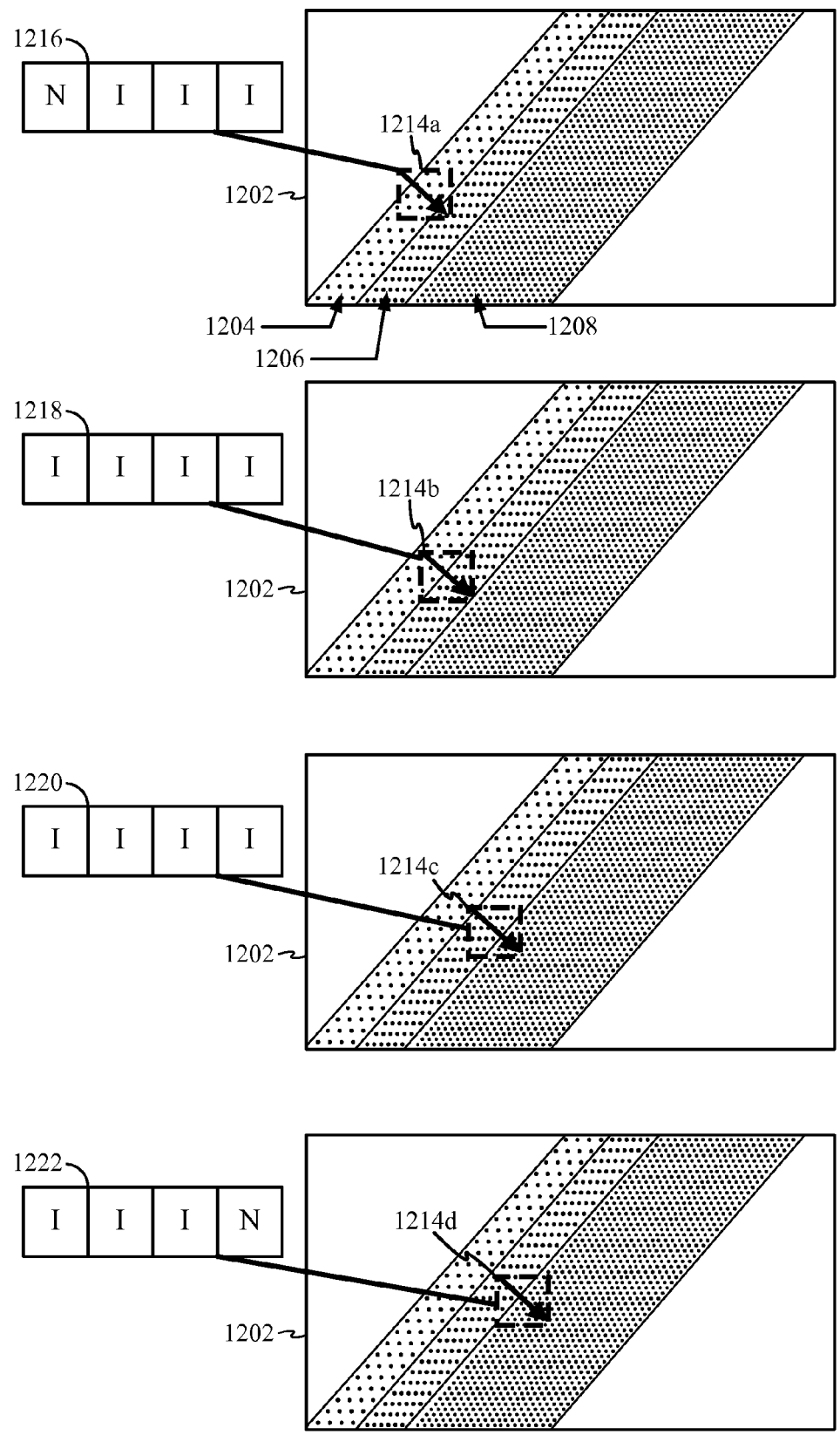
FIG. 12 illustrates an example of soft edge detection exhibiting increasing pixel values according to the method illustrated in FIGS. 9, 10, and 11.

FIG. 12 illustrates an example of soft edge detection exhibiting increasing pixel values according to the method illustrated in FIGS. 9, 10, and 11. An image 1202 may include soft edge transition regions 1204, 1206, and 1208 in which pixel values change gradually (i.e., Increase) from one transition to the next. These transition regions 1204, 1206, and 1208 may be from one pixel up to a few pixels wide. A pixel region 1214a is selected and a first string pattern 1216 is obtained along a first diagonal as indicated. A second pixel region 1214b is obtained by shifting the first pixel region 1214a by one or more pixels. A second string pattern 1218 is obtained along the first diagonal of the second pixel region 1214b. Similarly, a third string pattern 1220 and fourth string pattern 1222 are obtained from a third pixel region 1214c and fourth pixel region 1214d, respectively. These string patterns 1216, 1218, 1220, and 1222 may indicate a change in a pixel characteristic, such as color, intensity, luma, or chroma, as the pixel region 1214 moves across the soft edge transition regions 1204, 1206, and 1208. For instance, the first string pattern 1216 may be generated when transitioning into region 1204, the second string pattern 1218 may be generated when transitioning between regions 1204 and 1206, the third string pattern 1220 may be generated when transitioning between regions 1204, 1206 and 1208, and the fourth string pattern 1222 may be generated when transitioning between regions 1206 and 1208. These string patterns may indicate an increase in a pixel characteristic (e.g., color, intensity, luminescence, or shading) when transitioning between regions 1204, 1206 and 1208.

Figure 13:
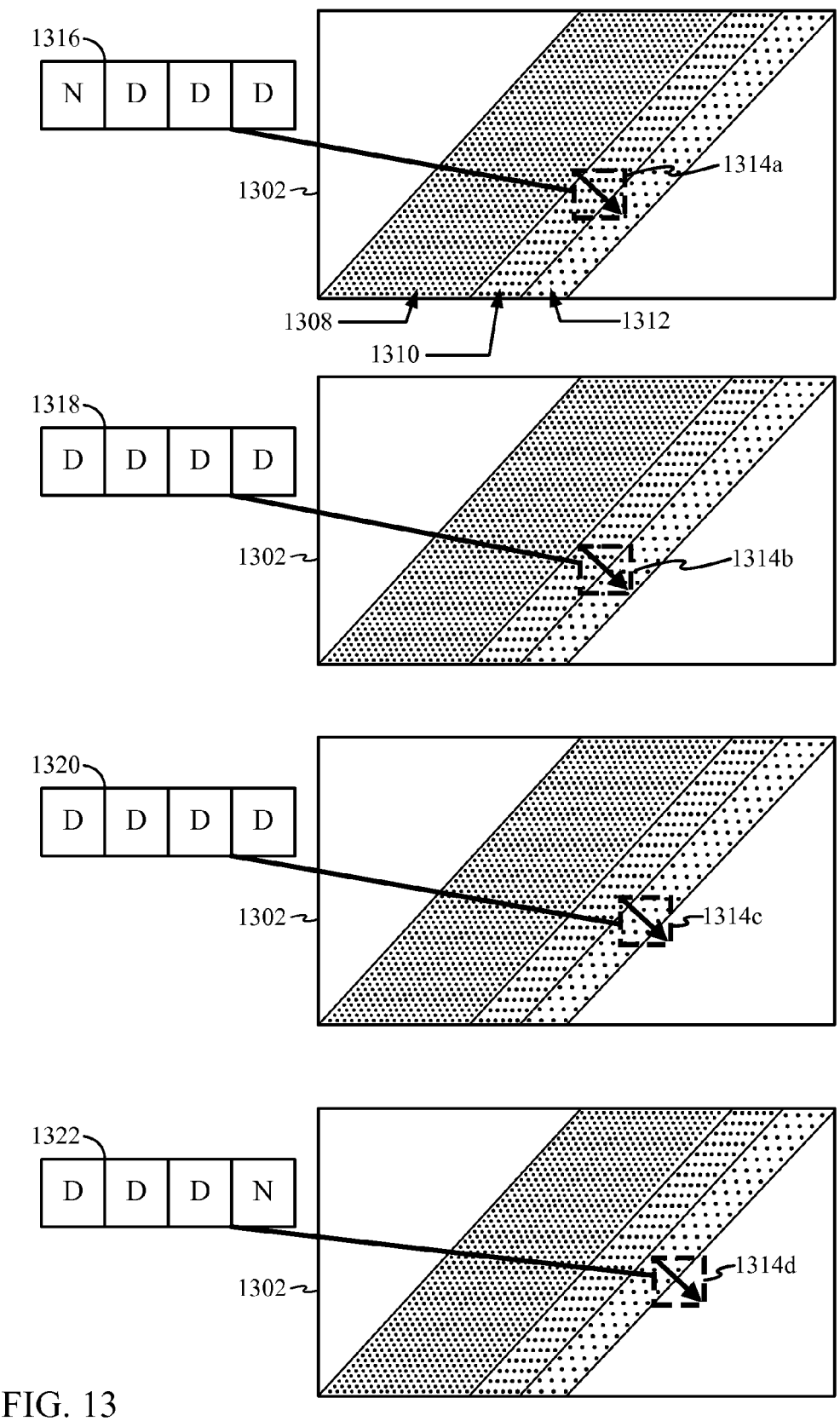
FIG. 13 illustrates an example of soft edge detection exhibiting decreasing pixel values according to the method illustrated in FIGS. 9, 10, and 11.

FIG. 13 illustrates an example of soft edge detection exhibiting decreasing pixel values according to the method illustrated in FIGS. 9, 10, and 11. An image 1302 may include soft edge transition regions 1308, 1310, and 1312 in which pixel values change gradually (i.e., Decrease) from one transition to the next. These transition regions 1308, 1310, and 1312 may be from one pixel up to a few pixels wide. A pixel region 1314a is selected and a first string pattern 1316 is obtained along a first diagonal as indicated. A second pixel region 1314b is obtained by shifting the first pixel region 1314a by one or more pixels. A second string pattern 1318 is obtained along the first diagonal of the second pixel region 1314b. Similarly, a third string pattern 1320 and fourth string pattern 1322 are obtained from a third pixel region 1314c and a fourth pixel region 1314d, respectively. These string patterns 1316, 1318, 1320, and 1322 may indicate a change in a pixel characteristic, such as color, intensity, luma, or chroma, as the pixel region 1314 moves across the soft edge transition regions 1308, 1310, and 1312. For instance, the first string pattern 1316 may be generated when transitioning from region 1308 to region 1310, the second string pattern 1318 may be generated when transitioning between regions 1308, 1310, and 1312, the third string pattern 1320 may be generated when transitioning between regions 1310 and 1312, and the fourth string pattern 1322 may be generated when transitioning out of region 1312. These patterns indicate a decrease in a pixel characteristic (e.g., color, intensity, luminescence, or shading) when transitioning between regions 1308, 1310 and 1312.

Figure 14:
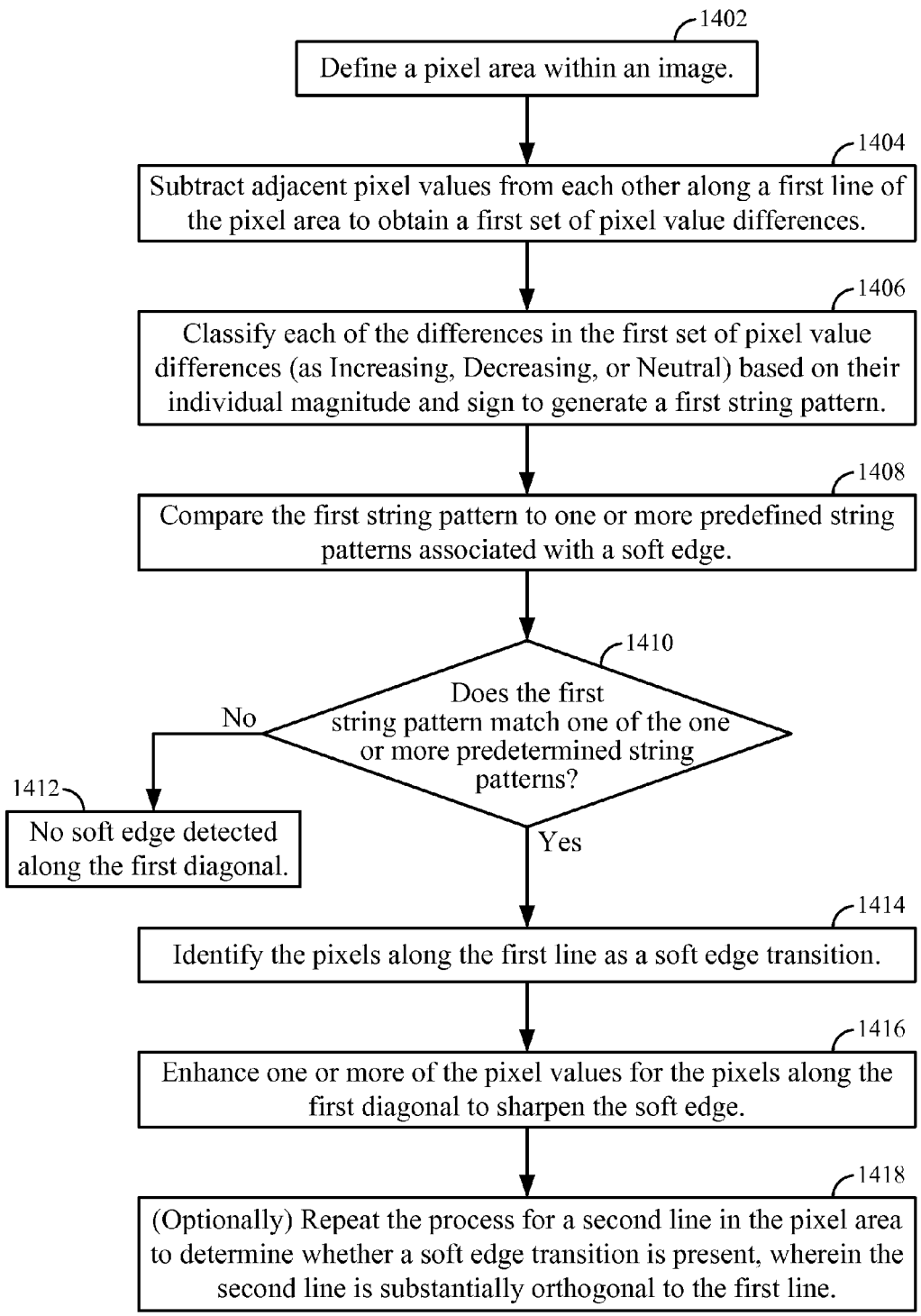
FIG. 14 illustrates method for soft edge detection according to one example.

FIG. 14 illustrates method for soft edge detection according to one example. A pixel area within an image is defined 1402. For example, such pixel area may be a five (5) pixel by five (5) pixel area as illustrated in FIGS. 9 and 10. Adjacent pixel values are subtracted from each other along a first line of the pixel area to obtain a first set of pixel value differences 1404. Each of those differences may be classified (e.g., as Increasing, Decreasing, or Neutral) based on their individual magnitude and sign to generate a first string pattern 1406. For example, pixel value differences may be classified based on whether the difference is greater than a positive minimum threshold or less than a negative minimum threshold, as illustrated in FIG. 11.

The first string pattern is compared to a string pattern library having one or more predefined string patterns indicative of or associated with a soft edge 1408. For example, the string patterns illustrated in FIG. 11 may be associated with a soft edge. Then, determine whether the first string pattern matches one of the one or more predefine string patterns 1410. If there is no match, then no soft edge is detected along the first line 1412. Otherwise, the pixels along the first line are identified as a soft edge transition 1414. One or more of the pixel values for the pixels along the first line may then be enhanced to sharpen the soft edge 1416.

This process may be, optionally, repeated for a second line in the pixel area to determine whether a soft edge transition is present, wherein the second line is substantially orthogonal to the first line. 1418. Moreover, this process may be performed or repeated for a vertical column of pixels of the pixel area 1420 and/or for a horizontal row of pixels of the pixel area 1422.

In various implementations, this process may be performed and/or repeated for diagonal lines of pixels, vertical lines of pixels, and/or horizontal lines of pixels of the pixel area.

The methods illustrated in FIGS. 8-14 may be separately performed for different pixel characteristics defining an image. For example, soft edge detection may be separately performed for green, red, and/or blue pixels of an image. Alternatively, soft edge detection may be performed on luma and/or chroma information for pixels making up an image. Additionally, while various examples have used diagonal lines to illustrate detection of soft edges or transitions, it should be understood that vertical and/or horizontal pixel lines may also be used to detect such edges. For example, a pair of substantially orthogonal diagonal, vertical, and/or horizontal lines within an image region may be used to detect soft edges.

Hard Edge Detection and/or Filtering

While detecting and sharpening soft edges may improve an image, changing already well-defined hard edges is undesirable. Therefore, it would be helpful to identify those pixels that define hard edges to avoid modifying them. That is, by identifying hard edges, their associated pixels can be excluded from filtering and/or sharpening operations.

Figure 15:
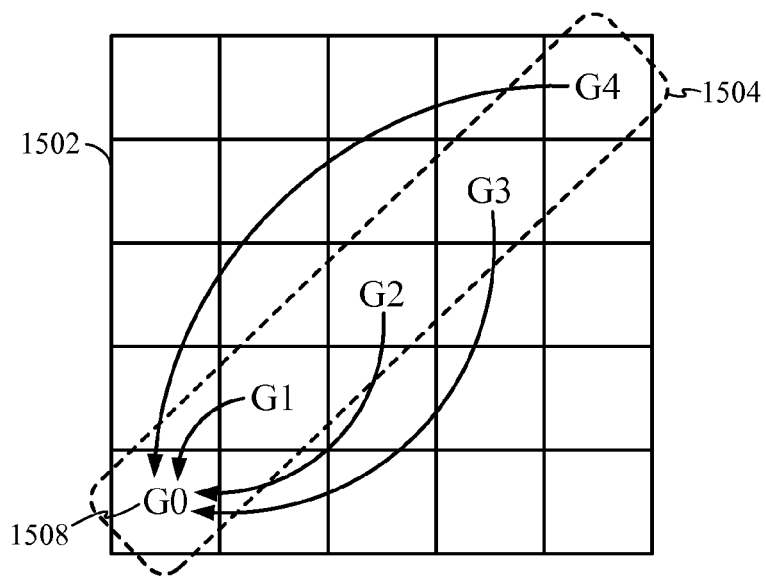
FIGS. 15 and 16 illustrate a method for scanning a selected region of an image to ascertain whether a hard edge is present.
Figure 16:
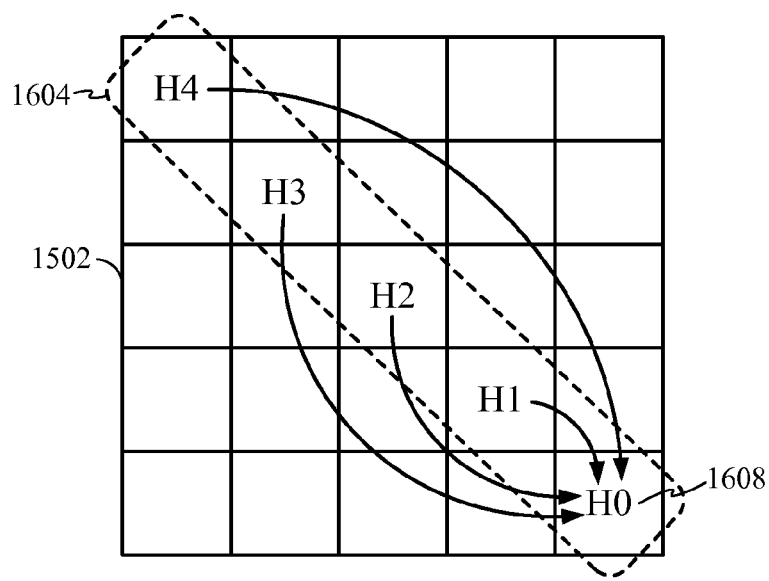

FIGS. 15 and 16 illustrate a method for scanning a selected region of an image to ascertain whether a hard edge is present. In one example, the image may be scanned in overlapping regions of five (5) pixels by five (5) pixels. For instance, each region may overlap an adjacent region by four pixel columns and/or four pixel rows. Pixels used for defining a region may be of the same color (e.g., all green, red, or blue).

For a selected pixel region 1502, pixel value differences are obtained by subtracting a first pixel value 1508 (G0) from other pixels along a first diagonal 1504 to obtain a string pattern G 1506. That is, the new string pattern G 1506 is defined as $P_G1 = G4 - G0$, $P_G2 = G3 - G0$, $P_G3 = G2 - G0$, and $P_G4 = G1 - G0$. If the difference between pixel values $G_n$ and $G_0$ is greater than a threshold value (+Threshold), then the corresponding pattern value $P_Gx$ is said to be increasing (I), where n is a positive integer between 1 and 4. Similarly, if the difference between pixel values $G_n$ and $G_0$ is less than the negative of the threshold value (−Threshold), then the corresponding pattern value $P_Gx$ is said to be decreasing (D). Otherwise, if the difference between pixel values $G_n$ and $G_0$ is less than the positive threshold value (+Threshold) and more than the negative threshold value (−Threshold), then the corresponding pattern value $P_Gx$ is said to be neutral (N).

Similarly, pixel value differences are obtained by subtracting a first pixel value 1608 (H0) from pixels along a second diagonal 1604 of the selected pixel region 1502 to obtain a string pattern H 1606. That is, the new string pattern H 1606 is defined as $P_H1=H4-H0$, $P_H2=H3-H0$, $P_H3=H2-H0$, and $P_H4=H1-H0$.

Figure 17:
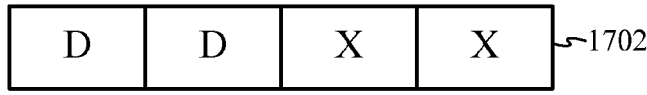
FIG. 17 illustrates six string patterns that may indicate a hard edge.
Figure 17:
Figure 17:
Figure 17:
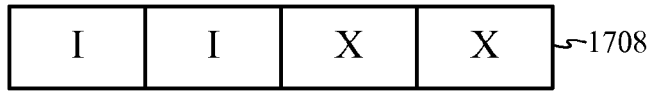
Figure 17:
Figure 17:

FIG. 17 illustrates six string patterns that may indicate a hard edge. These string patterns 1702, 1704, 1706, 1708, 1710 and 1712 indicate at least two adjacent pixel values are significantly different from a first pixel value (e.g., G0 or H0) indicating an abrupt change in a pixel characteristic (e.g., color, intensity, luma, chroma, etc.) along a diagonal of a selected pixel region.

The number of consecutive or adjacent pixels exhibiting an Increasing or Decreasing pixel characteristic (e.g., color, intensity, luma, chroma, etc.) as compared to a first pixel value G0 or H0, may be based on the probability that a hard edge can be accurately identified based on that number of consecutive or adjacent pixels. Thus, this number may be modified or adjusted based on available processing power, image quality, and/or acceptable delays, among other factors. For example, in some implementation, one, two, or three consecutive or adjacent pixels having an Increasing or Decreasing pixel characteristic may indicate a hard edge.

Figure 18:
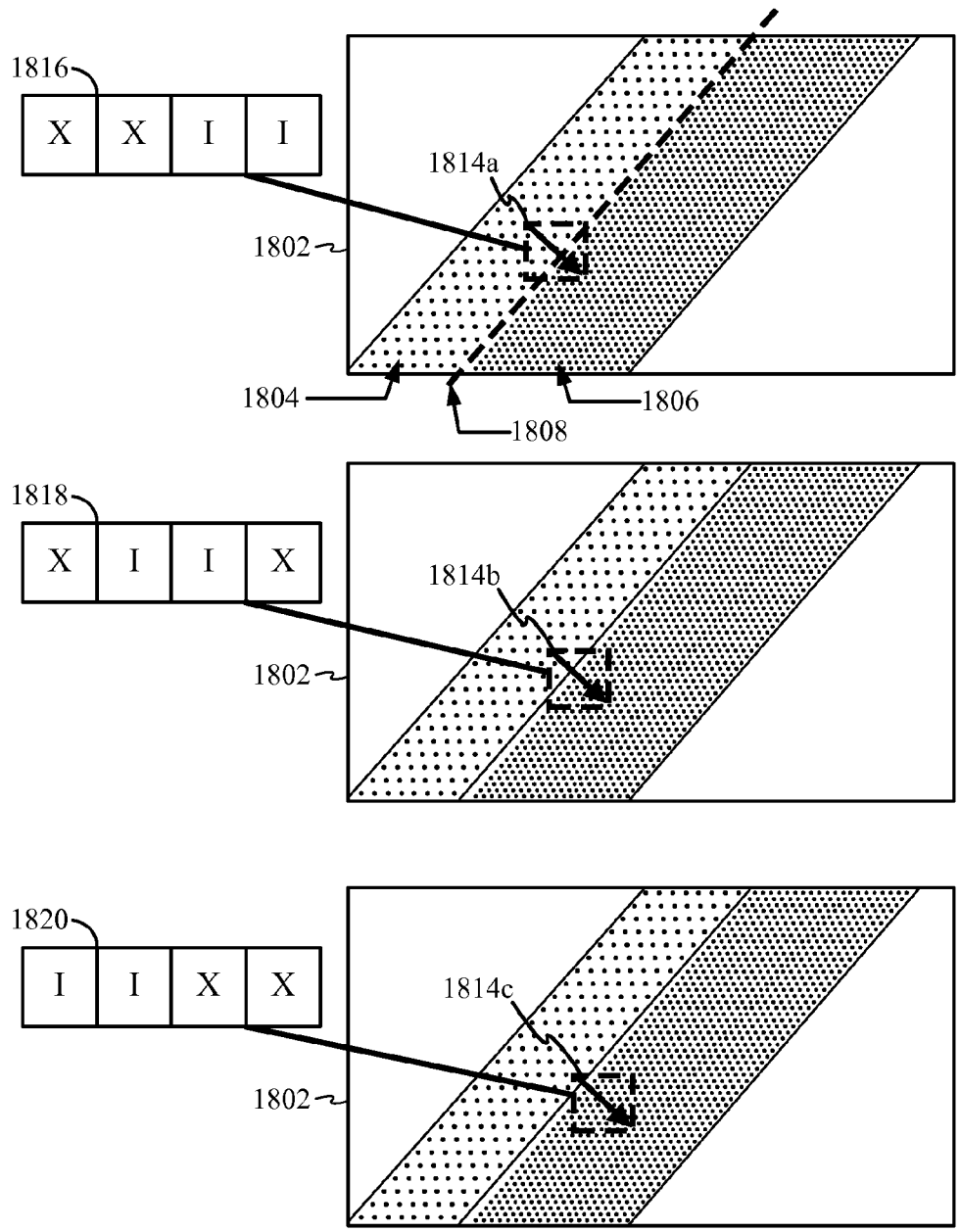
FIG. 18 illustrates an example of hard edge detection exhibiting increasing pixel values, in comparison to a first pixel value, according to the method illustrated in FIGS. 15, 16, and 17.

FIG. 18 illustrates an example of hard edge detection exhibiting increasing pixel values, in comparison to a first pixel value, according to the method illustrated in FIGS. 15, 16, and 17. An image 1802 may include two regions 1804 and 1806, having different pixel characteristics, in which pixel values change (i.e., Increase) from one region to the next. A pixel region 1814a is selected and a first string pattern 1816 is obtained along a first diagonal as indicated. A second pixel region 1814b is obtained by shifting the first pixel region 1814a by one or more pixels. A second string pattern 1818 is obtained along the first diagonal of the second pixel region 1814b. Similarly, a third string pattern 1820 is obtained from a third pixel region 1814c. These string patterns 1816, 1818, and 1820 may indicate a change in a pixel characteristic, such as color, intensity, luma, or chroma, as the pixel region 1814 moves across a hard edge transition 1808 between regions 1804 and 1806.

Figure 19:
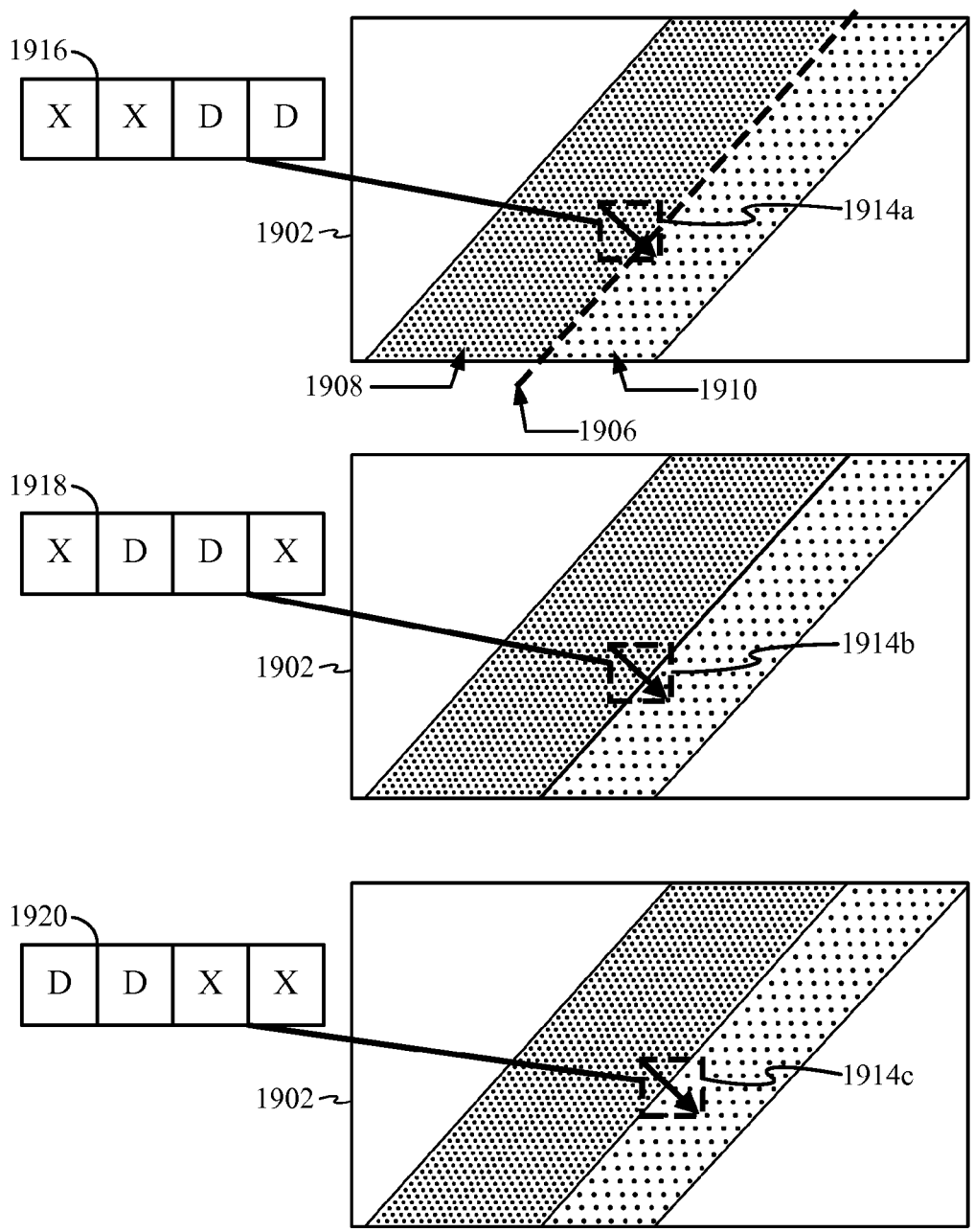
FIG. 19 illustrates an example of hard edge detection exhibiting decreasing pixel values, in comparison to a first pixel value, according to the method illustrated in FIGS. 15, 16, and 17.

FIG. 19 illustrates an example of hard edge detection exhibiting decreasing pixel values, in comparison to a first pixel value, according to the method illustrated in FIGS. 15, 16, and 17. An image 1902 may include two regions 1908 and 1910, having different pixel characteristics, in which pixel values change (i.e., Decrease) from one region to the next. A pixel region 1914a is selected and a first string pattern 1916 is obtained along a first diagonal as indicated. A second pixel region 1914b is obtained by shifting the first pixel region 1914a by one or more pixels. A second string pattern 1918 is obtained long the first diagonal of the second pixel region 1914b. Similarly, a third string pattern 1920 is obtained from a third pixel region 1914c. These string patterns 1916, 1918, and 1920 may indicate a change in a pixel characteristic, such as color, intensity, luma, or chroma, as the pixel region 1914 moves across a hard edge transition 1906 between regions 1908 and 1910.

Figure 20:
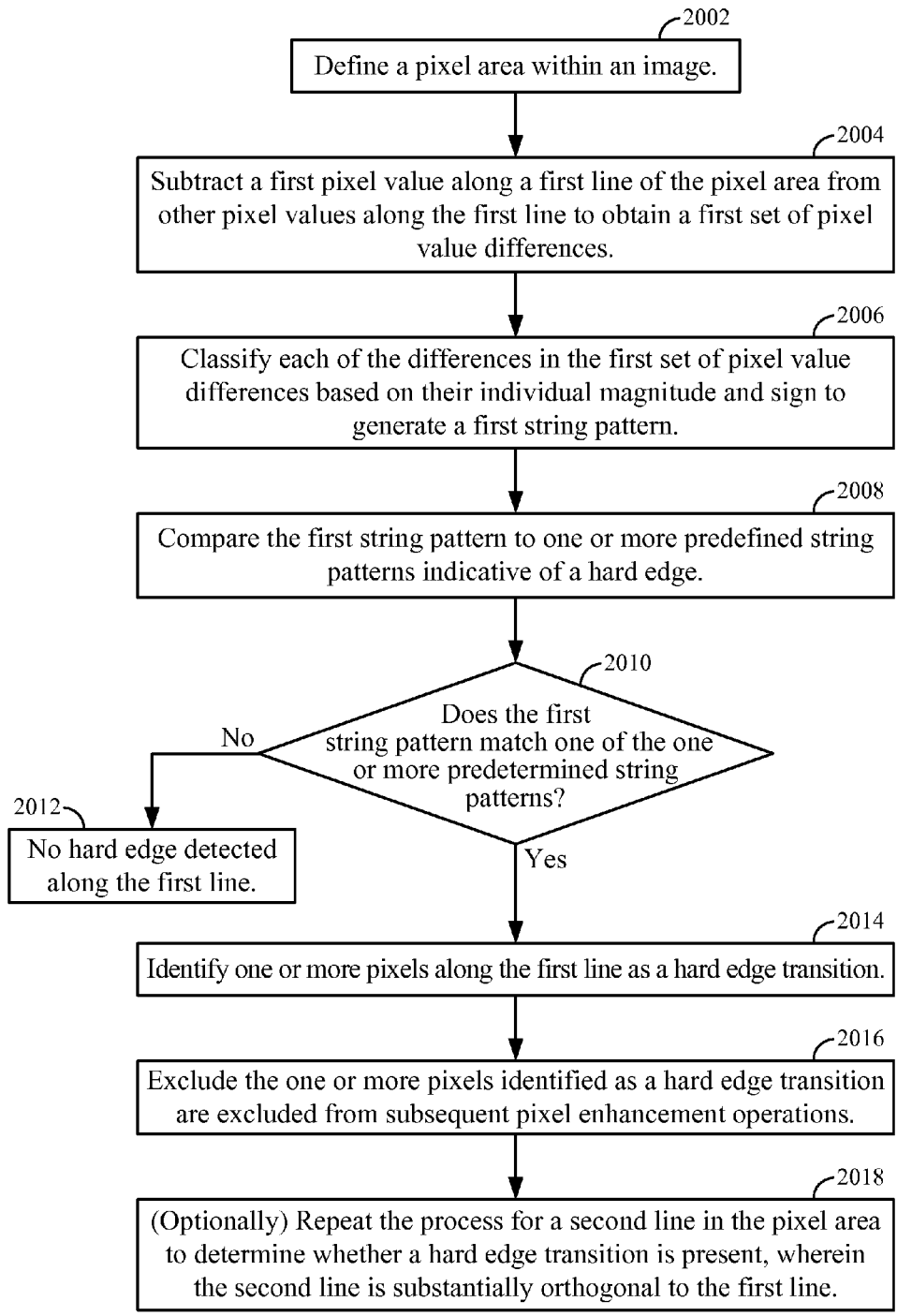
FIG. 20 illustrates method for hard edge detection according to one example.

FIG. 20 illustrates method for hard edge detection according to one example. A pixel area within an image is defined 2002. For example, such pixel area may be a five (5) pixel by five (5) pixel area as illustrated in FIGS. 15 and 16. A first pixel value along a first line of the pixel area is subtracted from other pixel values along the first line to obtain a first set of pixel value differences 2004. Each of those differences may be classified (e.g., as Increasing, Decreasing, or Neutral) based on their individual magnitude and sign to generate a first string pattern 2006. For example, pixel value differences may be classified based on whether the difference is greater than a positive minimum threshold or less than a negative minimum threshold, as illustrated in FIG. 17.

The first string pattern is compared to one or more pre-define string patterns associated with a hard edge 2008. For example, the string patterns illustrated in FIG. 17 may be associated with a hard edge. Then, determine whether the first string pattern matches one of the one or more string patterns 2010. If there is no match, then no hard edge is detected along the first line 2012. Otherwise, one or more of the pixels along the first line are identified as a hard edge transition 2014. The one or more pixels identified as a hard edge transition are excluded from subsequent pixel enhancement operations 2016.

This process may be, optionally, repeated for a second line in the pixel area to determine whether a hard edge transition is present, wherein the second line is substantially orthogonal to the first line 2018. In various implementations, this process may be performed and/or repeated for diagonal lines of pixels, vertical lines of pixels, and/or horizontal lines of pixels of the pixel area.

The methods illustrated in FIGS. 15-20 may be separately performed for different pixel characteristics defining an image. For example, hard edge detection may be separately performed for green, red, and/or blue pixels of an image. Alternatively, hard edge detection may be performed on luma and/or chroma information for pixels making up an image. Additionally, while various examples have used diagonal lines to illustrate hard edge detection, it should be understood that vertical and/or horizontal pixel lines may also be used to detect such edges. For example, a pair of substantially orthogonal diagonal, vertical, and/or horizontal lines within an image region may be used to detect hard edges.

Figure 21:
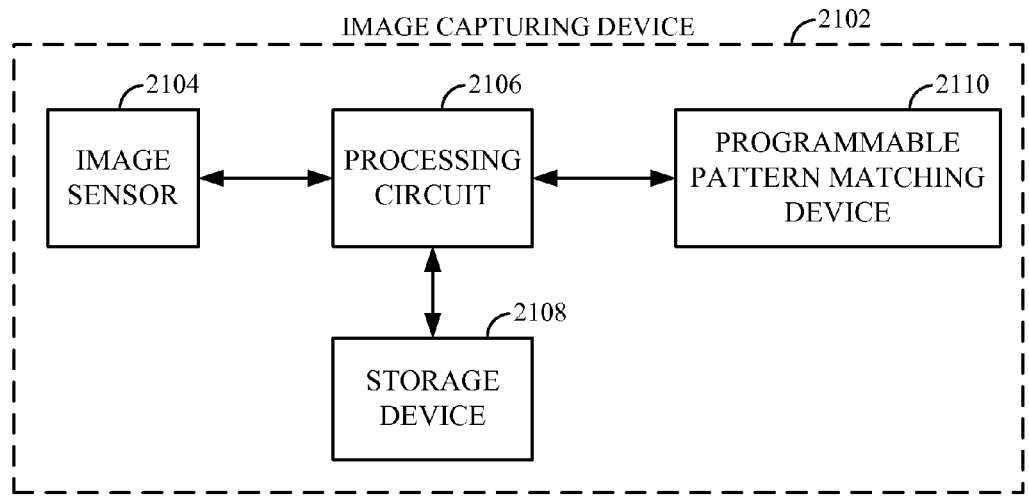
FIG. 21 illustrates an image capturing device including a programmable pattern matching device.

FIG. 21 illustrates an image capturing device including a programmable pattern matching device. The image capturing device 2102 may include an image sensor 2104 to capture images, a processing circuit 2106 to control processing of such captured images, a storage device 2108 to store the captured images, and a programmable patterns matching device 2110 to assist in the processing of images.

Figure 22:
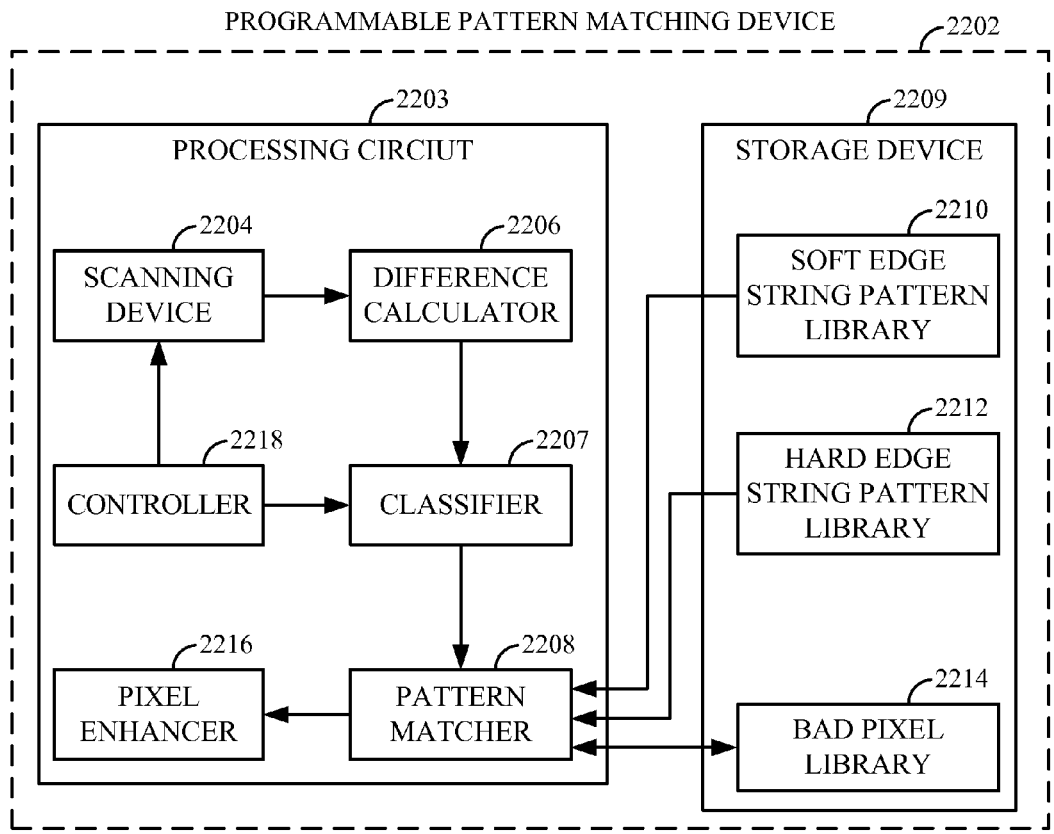
FIG. 22 illustrates an example of a programmable pattern matching device.

FIG. 22 illustrates an example of a programmable pattern matching device. The programmable pattern matching device 2202 may comprise a processing circuit 2003, including a scanning device 2204 (e.g., pixel parser, etc.) to scan images and/or obtain photosensor pixel values, a difference calculator 2206 (e.g., bit adder, etc.) to perform pixel value calculations, a classifier 2207 (e.g., comparator, programmable logic device, etc.) may classify pixel values into classes to form string patterns, a pattern matcher 2208 (e.g., comparator, etc.) to match a calculated string pattern to a stored string pattern. The processing circuit 2203 may also include a controller 2218 coupled to the scanning device 2203 and/or the classifier 2207 to direct the scanning operations (e.g., of a pixel sensor and/or on a captured image). For example, the controller 2218 may dictate which pixel area to process and which diagonal, column, and/or row to process. A storage device 2209 (e.g., RAM, ROM, EEPROM, flash memory, etc.) may serve to store pattern and/or pixel libraries. For example, a soft edge string pattern library 2210 may store a plurality of string patterns indicative of a soft edge. Similarly, a hard edge pattern library 2212 may store a plurality of string patterns indicative of a hard edge. A bad pixel library 2214 is maintained where bad or faulty photosensors may be identified. An internal or external pixel enhancer 2216 may serve to replace pixel values for a bad photosensor (e.g., by averaging surrounding pixel values to generate a replacement pixel value for the bad photosensor) and/or sharpen pixels identified as being part of a soft edge.

The programmable pattern matching device 2202 may be configured to perform one or more of the methods illustrated in FIGS. 1-20. For example, the device 2202 may perform (1) bad pixel detection and/or correction, (2) bad pixel cluster detection and/or correction, (3) soft edge detection and/or correction, and/or (4) hard edge detection.

In one configuration, the programmable pattern matching device 2202 may determine whether there is a bad photosensor or pixel in an image sensor. A bad pixel pattern library 2214 (in storage device 2209) stores a plurality of predefined string patterns indicative of or associated with a bad photosensor or pixel. The scanning device 2204 may be configured to identify a first photosensor in a grid of photosensors and obtain its associated first pixel value, and/or identify a first plurality of photosensors surrounding the first photosensor and obtain pixel values associated with the first plurality of photosensors, the first plurality of photosensors having the same color sensitivity as the first photosensor. The difference calculator 2206 may be configured to subtract the first pixel value from the first plurality of photosensor pixel values to obtain a first set of pixel value differences (e.g., Increasing, Decreasing, Neutral). The classifier 2207 classifies each of the differences in the first set of pixel value differences based on their individual magnitude and sign to generate a first string pattern. The pattern matcher 2208 compares the first string pattern to one or more predefined string patterns indicative of a bad photosensor. The pattern matcher 2208 identifies the first photosensor as bad if all the pixel value differences in the first set of pixel value differences have the same classification. In this manner, bad photosensors may be identified and their pixel values may be ignored or replaced, for example, by averaging adjacent pixel values.

The programmable pattern matching device 2202 may also determine whether a bad cluster of pixels exists. The pattern matcher 2208 effectively determines whether a first pixel value difference in the first set of pixel value differences is classified differently from the remaining first set of pixel value differences. If so, the scanning device 2204 identifies a second photosensor associated with the first pixel value difference and obtains its associated second pixel value. The difference calculator 2206 subtracts the second pixel value from other pixel values associated with a second plurality of photosensors to obtain a second set of pixel value differences. The classifier 2207 then classifies each difference in the second set of pixel value differences based on their individual magnitude and sign to generate a second string pattern. The pattern matcher 2208 determines whether the second string pattern is indicative of a bad second photosensor. In this matter, a cluster of bad photosensors may be identified.

The programmable pattern matching device 2202 may also detect soft edges in an image. The scanning device 2204 defines a first pixel area within an image. The difference calculator 2206 subtracts adjacent pixel values from each other along a first diagonal of the first pixel area to obtain a second set of pixel value differences. The classifier 2207 classifies each of the differences in the second set of pixel value differences based on their individual magnitude and sign to generate a second string pattern. The pattern matcher 2208 compares the second string pattern to one or more predefined string patterns indicative of a soft edge and identifies the pixels along the first diagonal as a soft edge transition if the second string pattern matches one of the one or more predefined string patterns indicative of a soft edge. In this manner, the soft edges in an image may be identified for selective sharpening of the soft edge pixels, thereby improving or enhancing the image.

Additionally, the programmable pattern matching device 2202 may also detect hard edges in an image. For example, the scanning device 2204 may define a first pixel area within an image. The difference calculator 2206 may subtract a first pixel value along the first diagonal of the pixel area (of an image) from other pixel values along the first diagonal to obtain a second set of pixel value differences. The classifier 2207 may classify each of the differences in the second set of pixel value differences based on their individual magnitude and sign to generate a second string pattern. The pattern matcher 2208 may compare the second string pattern to one of one or more predefined string patterns indicative of a hard edge, and/or identify one or more pixels along the first diagonal as a hard edge transition if the second string pattern matches one of the one or more predefined string patterns indicative of a hard edge.

One or more of the components, operations, and/or functions illustrated in FIGS. 1-22 may be rearranged and/or combined into a single component, operation, or function or device in several components, actions, or functions without departing from the spirit and scope of the disclosure. Additional elements, components, operation, and/or functions may also be added without departing from the spirit and scope of the disclosure. The apparatus, devices, and/or components illustrated in FIGS. 1, 21 and/or 22 may be configured to perform one or more of the methods, features, or operations described in FIGS. 2-20.

Those of skill would further appreciate that the various illustrative logical blocks, modules, circuits, and algorithm operations described in connection with the examples disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system.

It should be noted that the foregoing configurations are merely examples and are not to be construed as limiting the spirit and scope of the disclosure. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method to detect a defective photosensor pixel in an image capturing device, comprising:
    obtaining a first pixel value of a first photosensor pixel;
    identifying a first plurality of photosensor pixels comprising a set of photosensor pixels having a predetermined order related to a corresponding spatial relationship of each of the first plurality of photosensor pixels with respect to the first photosensor pixel and obtaining a corresponding pixel value associated with each of the first plurality of photosensor pixels;

subtracting the first pixel value from each of the corresponding pixel value of the first plurality of photosensor pixels to obtain a first set of pixel value differences;

generating a first string pattern associated with the first set of pixel value differences by:

assigning a corresponding classification to each pixel value difference of the first set of pixel value differences, wherein each classification is assigned based at least in part on a magnitude of the corresponding pixel value difference and at least in part on a sign of the corresponding pixel value difference; and forming an ordered set of elements ordered according to the predetermined order, wherein each element includes an assigned classification associated with a corresponding one of the first set of pixel value differences;

comparing the first string pattern to each string pattern in a group of predefined string patterns, the group of predefined string patterns including at least three distinct predefined string patterns, wherein a match between the first string pattern and any of the predefined string patterns in the group of predefined string patterns indicates that the first photosensor pixel is defective.

2. The method of claim 1, wherein assigning the corresponding classification comprises:

when a particular pixel value difference exceeds a first threshold value, assigning a first classification value to the particular pixel value difference;

when the particular pixel value difference is less than a second threshold value, assigning a second classification value to the particular pixel value difference; and when an absolute value of the particular pixel value difference is less than a third threshold, assigning a third classification value to the particular pixel value difference.

3. The method of claim 2, further comprising determining that one of the plurality of photosensor pixels is defective when the first string pattern matches a particular predetermined string pattern that includes N elements, wherein N-1 of the elements have the first classification value and one of the elements has the third classification value.

4. The method of claim 2, further comprising determining that one of the plurality of photosensor pixels is defective when the first string pattern matches a particular predetermined string pattern that includes N elements, wherein N-1 of the elements have the second classification value and one of the elements has the third classification value.

5. The method of claim 1, wherein the first photosensor pixel and each of the first plurality of photosensor pixels have a substantially same color sensitivity.

6. The method of claim 1, wherein each classification value included in a first predetermined string pattern has a first value.

7. The method of claim 1, further comprising, in response to identifying the first photosensor pixel to be defective, outputting a replacement value of the first photosensor pixel, the replacement value comprising an average of the pixel values of the first plurality of photosensor pixels.

8. The method of claim 1, wherein at least one of the group of predefined string patterns is associated with a failure of one of the first plurality of photosensor pixels.

9. A pattern matching device comprising:

means for obtaining a first pixel value of a first photosensor pixel;

means for identifying a first plurality of photosensor pixels, the first plurality of photosensor pixels having a predetermined order related to a corresponding spatial relationship of each of the first plurality of photosensor pixels with respect to the first photosensor pixel, and for obtaining a corresponding pixel value associated with each of the first plurality of photosensor pixels;

means for subtracting the first pixel value from each pixel value of the first plurality of photosensor pixel values to obtain a first set of pixel value differences;

means for generating a first string pattern associated with the first set of pixel value differences including:

means for assigning a corresponding classification to each pixel value difference of the fist set of pixel value differences, wherein each classification is assigned based at least in part on a magnitude of the corresponding pixel value difference and at least in part on a sign of the corresponding pixel value difference; and means for forming an ordered set of elements ordered according to the predetermined order, wherein each element includes an assigned classification associated with a corresponding one of the first set of pixel value differences;

means for comparing the first string pattern to each of a group of predefined string patterns to determine whether there is a match between the first string pattern and any of the group of predefined string patterns indicating that the first pixel is defective, wherein the group of predefined string patterns includes at least three distinct predefined string patterns.

10. The pattern matching device of claim 9, wherein the means for assigning the corresponding classification comprises:

means for assigning a first classification value to a particular pixel value difference when the particular pixel value difference exceeds a first threshold value;

means for assigning a second classification value to the particular pixel value difference when the particular pixel value difference is less than a second threshold value; and means for assigning a third classification value to the particular pixel value difference when an absolute value of the particular pixel value difference is less than a third threshold.

11. The pattern matching device of claim 10, wherein the means for comparing is further to determine that one of the plurality of photosensor pixels is defective when the first string pattern matches a particular predetermined string pattern that includes N elements, wherein N-1 of the elements have the first classification value and one of the elements has the third classification value.

12. The pattern matching device of claim 10, wherein the means for comparing is further to determine that one of the plurality of photosensor pixels is defective when the first string pattern matches a particular predetermined string pattern that includes N elements, wherein N-1 of the elements have the second classification value and one of the elements has the third classification value.

13. The device of claim 9, wherein the first photosensor pixel and each of the first plurality of photosensor pixels have a substantially same color sensitivity.

14. The pattern matching device of claim 9, wherein at least one of the group of predefined string patterns is associated with a failure of one of the plurality of photosensor pixels.

15. A pattern matching device comprising:

a processing circuit configured to:

obtain a first pixel value of a first photosensor pixel;

identify a first plurality of photosensor pixels having a predetermined order related to a corresponding spatial relationship of each of the plurality of photosensor pixel with respect to the first photo sensor pixel, and obtain a corresponding pixel value associated with each of the first plurality of photosensor pixels;

subtract the first pixel value from each pixel value of the first plurality of photosensor pixel values to obtain a first set of pixel value differences;

generate a first string pattern associated with the first set of pixel value differences by:
  assigning a corresponding classification to each pixel value difference of the first set of pixel value differences, wherein each classification is assigned based at least in part on a magnitude of the corresponding pixel value difference and at least in part on a sign of the corresponding pixel value difference; and
  forming an ordered set of elements ordered according to the predetermined order, wherein each element includes an assigned classification associated with a corresponding one of the first set of pixel value differences;

compare the first string pattern to each string pattern in a group of predetermined string patterns, the group of predetermined sting patterns including at least three distinct predefined string patterns, wherein a match between the first string pattern and any of the predefined string patterns of the group of predefined string patterns indicates that the first pixel is defective.

16. The device of claim 15, wherein each classification value included in a first predefined string pattern has a first value.

17. The device of claim 15, wherein the processing circuit is further configured to: p1 subtract adjacent pixel values along a first line of a particular pixel area within an image to obtain a second set of pixel value differences;

generate a second string pattern based on the classification of each of the second set of pixel value differences, wherein each classification is assigned based at least in part on the magnitude of the corresponding pixel value difference and at least in part on a sign of the corresponding pixel value difference;

compare the second string pattern to one or more predefined soft edge string patterns; and identify the first line as a soft edge transition when the second string pattern matches one of the predefined soft edge string patterns.

18. The device of claim 15, wherein the processing circuit is further configured to:

obtain a second set of pixel value differences by subtracting the first pixel value along a first line of an image from other pixel values associated with other photosensor pixels along the first line;

generate a second string pattern based on a classification of each of the second set of pixel value differences;

compare the second string pattern to each of one or more predefined hard edge string patterns; and identify one or more pixels along the first line as a hard edge transition when the second string pattern matches one of the one or more of the predefined hard edge string patterns.

19. The pattern matching device of claim 15, wherein at least one of the group of predefined string patterns is associated with a failure of one or the plurality of photosensor pixels.

20. The pattern matching device of claim 15, wherein assigning the corresponding classification comprises:
  when a particular pixel value difference exceeds a first threshold value, assigning a first classification value to the particular pixel value difference;
  when the particular pixel value difference is less than a second threshold value, assigning a second classification value to the particular pixel value difference; and
  when a absolute value of the particular pixel value difference is less than a third threshold, assigning a third classification value to the particular pixel value difference.

21. A computer-readable medium storing instruction that when executed by a processor, cause the processor to:
  obtain a first pixel value of a first photosensor pixel;
  identify a first plurality of photosensor pixels comprising a set of photosensor pixels having a predetermined order related to a corresponding spatial relationship of each of the set of photosensor pixel with respect to the first photosensor pixel, and obtain a corresponding pixel value associated with each of the first plurality of photosensor pixels;
  subtract the first pixel value from each pixel value of the first plurality of photosensor pixel values to obtain a first set of pixel value differences;
  generate a first string pattern associated with the first plurality of pixel value differences by:
    assigning a corresponding classification to each pixel value difference of the first set of pixel value differences, wherein each classification is assigned based at least in part on a magnitude of the corresponding pixel value difference and at least in part on a sign of the corresponding pixel value difference; and
  forming an ordered set of elements ordered according to the predetermined order, wherein each element includes an assigned classification associated with a corresponding one of the first set of pixel value differences;
  compare the first string pattern to each of a group of predefined string patterns, the group of predefined string patterns including at least three distinct predefined string patterns, to determine whether there is a match between the first string pattern and any of the predefined string patterns of the group of predefined string patterns, indicating that the first pixel is defective.

22. The computer-readable medium of claim 21, wherein each classification value included in a first predefined string pattern has a first value.

23. The computer-readable medium of claim 21, further comprising additional instruction that when executed by the processor, cause the processor to output a replacement value of the first photosensor pixel when the first photosensor pixel is identified to be defective, the replacement value comprising an average of the pixel values of the first plurality of photosensors.

24. A method of processing an image, the method comprising:
  subtracting adjacent pixel values along a first line comprising N pixels of a first pixel area within an image to obtain a first set of N-1 pixel value differences, wherein each pixel value is associated with a corresponding pixel of the first line;
  generating a first string pattern associated with the first set of pixel differences by:
    assigning a corresponding classification to each pixel value difference of the first set of pixel value differences, wherein each classification is assigned based at least in part on a magnitude of the corresponding pixel value difference and at least in part on a sign of the corresponding pixel value difference; and forming the first string pattern by ordering each of the assigned classifications according to a corresponding position of the corresponding pixel of the first line;

comparing the first string pattern to each string patter in a group of predetermined soft edge string patterns an when the comparison produces a match between the first string pattern and one of the predefined soft edge string patters, identifying the pixels along the first line to be a soft edge.

25. The method of claim 24, further comprising enhancing one of the pixel values along the first line to sharpen the soft edge.

26. The method of claim 24, further comprising identifying the pixels along the first line to be the soft edge transition when each of the differences in the first set of pixel value differences has a corresponding sign that is positive.

27. The method of claim 24, further comprising identifying the pixels along the first line to be the soft edge transition when each of the difference in the first set of pixel value differences has a corresponding sign that is negative.

28. The method of claim 24, wherein assigning the corresponding classification comprises:

when a particular pixel value difference exceeds a first threshold value, assigning a first classification value to the particular pixel value difference;

when the particular pixel value difference is less than a second threshold value, assigning a second classification value to the particular pixel value difference; and when an absolute value of the particular pixel value difference is less than a third threshold, assigning a third classification value to the particular pixel value difference.

29. The method of claim 24, further comprising:

subtracting adjacent pixel values along a second line comprising M pixels of the first pixel area to obtain a second set of pixel value differences, wherein each pixel value along the second line is associated with a corresponding pixel of the second line;

generating a second string pattern associated with the second set of pixel value differences by:

assigning a corresponding classification to each pixel value difference of the second set of pixel value difference, wherein each classification is assigned based at least in part on the magnitude of the corresponding pixel value difference and at least in part on the sign of the corresponding pixel value difference; and forming the second string pattern by ordering each of the assigned classifications of the second set of pixel value differences according to the position of the corresponding pixel of the second line;

comparing the second string pattern to each string pattern in a group of predefined soft edge string patterns; and when the comparison produces a match between the second string pattern and one of the predefined soft edge string patterns in the group of predefined soft edge string patterns, identifying the first pixel area to have a soft edge transition.

30. The method of claim 29, wherein the second line is substantially orthogonal to the first line.

31. The method of claim 24, further comprising:

subtracting a first pixel value along the first line of the first pixel area from other pixel values along the first line to obtain a third set of pixel value differences;

classifying each of the pixel value differences in the third set of pixel value differences based on the magnitude and the sign of the corresponding pixel value difference to generate a third string pattern;

comparing the third string pattern to one or more predefined hard edge string patterns that are indicative of a hard edge; and identifying one or more pixels along the first line as a hard edge transition when the third string pattern matches one of the one or more predefined hard edge string patterns.

32. The method of claim 31, further comprising preventing one or more of the pixels identified as a hard edge from being enhanced.

33. A pattern matching device comprising:

means for subtracting adjacent pixel values along a first line comprising N pixels of a first pixel area within an image to obtain a first set of N-1 pixel value differences, wherein each pixel value is associated with a corresponding pixel of the first line;

means for generating a first string pattern associated with the first set of pixel value differences by:

assigning a corresponding classification to each pixel value difference of the first set of pixel value differences, wherein each classification is assigned based at least in part on magnitude of the corresponding pixel value difference and at least in part on a sign of the corresponding pixel value difference; and forming the first string pattern by ordering each of the assigned classifications according to a position of the corresponding pixel of the first line;

means for comparing the first string pattern to each of a group of predetermined soft edge string patterns and for identifying the pixels along the first line to be a soft edge when the comparison produces a match between the first string pattern and one of the predefined soft edge string patterns.

34. The pattern matching device of claim 33, further comprising means for enhancing one or more of the pixel values to sharpen the soft edge.

35. The pattern matching device of claim 33, further comprising:

means for subtracting a first value along the first line of the first pixel area from other pixel values along the first line to obtain a second set of pixel value differences;

means for classifying each of the differences in the second set of pixel value differences based on a magnitude and a sign of the corresponding pixel value differences to generate a second string pattern;

means for comparing the second string pattern to one or more predefined hard edge string patterns that are indicative of a hard edge; and means for identifying one or more pixels along the first line as a hard edge transition when the second string pattern matches one of the one or more predefined hard edge string patterns 36. A pattern matching device comprising:

a processing circuit coupled to the storage device, the processing circuit configured to:

subtract adjacent pixel values along a first line comprising N pixels of a first pixel area within an image to obtain a first set N-1 pixel value differences, wherein each pixel value is associated with a corresponding pixel of the first line;

generate a first string pattern associated with the first set of pixel value differences by:

assigning a corresponding classification to each pixel value difference of the first set of pixel value differences, wherein each classification is assigned based at least in part on a magnitude of the corresponding pixel value difference and at least in part on a sign of the corresponding pixel value difference; and forming the first string pattern comprising N-1 assigned classifications by ordering each of the assigned classifications according to a position of the corresponding pixel of the first line; and compare the first string pattern to each string pattern in a group of predefined soft edge string patterns, and when the comparison produces a match between the first string pattern and one of the predefined soft edge string patterns, identify the pixels along the first line to be a soft edge.

37. The pattern matching device of claim 36, wherein the processing circuit is further configured to enhance one or more of the pixel values associated with the pixels along the first line to sharpen the soft edge.

38. The pattern matching device of claim 36, wherein the processing circuit is further configured to:

subtract a first pixel value along the first line of the first pixel area from other pixel values along the first line to obtain a second set of pixel value differences;

classify each of the differences in the second set of pixel value differences based on the magnitude and the sign of the corresponding pixel value difference to generate a second string pattern;

compare the second string pattern to one or more predefined hard edge string patterns; and identify one or more pixels along the first lien as a hard edge transition when the second string pattern matches one of the one or more of the predefined hard edge string patterns.

39. A computer-readable medium storing instruction that when executed by a processor causes the processor to:

subtract adjacent pixel values along a first line comprising pixels within an image to obtain a first set of pixel value differences;

generate a first string pattern associated with the first set of pixel value differences by:

assigning a corresponding classification to each pixel value difference of the first set of pixel value differences, wherein each classification is assigned based at least in part on a magnitude of the corresponding pixel value difference and at least in part on a sign of the corresponding pixel value difference; and forming the first string pattern comprising assigned classifications, wherein each of the assigned classification is ordered according to a position of the corresponding pixel of the first line; and compare the first string pattern to predefined soft edge string patterns and identify the pixels along the first line to be a soft edge when the comparison produces a match between the first string pattern and one of the predefined soft edge sting patterns.

40. The computer-readable medium of claim 39, further comprising additional instructions that when executed by the processor cause the processor to enhance one of the pixel values corresponding to one of the pixels along the first line.

41. The computer-readable medium of claim 39, further comprising additional instructions that when executed by the processor cause the processor to:

subtract a first pixel value alone the first line of the first pixel area from other pixel values along the first line to obtain a second set of pixel value differences;

classify each of the differences in the second set of pixel value differences based on the magnitude and the sign of the corresponding pixel value difference to generate a second sting pattern;

compare the second string pattern to one or more predefined hard edge string patterns; and identify one or more pixels along the first line as a hard edge transition when the second string pattern matches one of the one or more of predefined hard edge string patterns.

* * * * *